United States Patent [19]

Igarashi et al.

[11] Patent Number: 5,598,817
[45] Date of Patent: Feb. 4, 1997

[54] FUEL FEEDING SYSTEM FOR INTERNAL COMBUSTION ENGINE

[75] Inventors: Kyoya Igarashi; Tateo Kume, both of Okazaki; Masato Yoshida, Kyoto; Nobuaki Murakami, Kyoto; Hideyuki Oda, Kyoto, all of Japan

[73] Assignee: Mitsubishi Jidosha Kogyo Kabushiki Kaisha, Tokyo, Japan

[21] Appl. No.: 303,008

[22] Filed: Sep. 8, 1994

[30] Foreign Application Priority Data

| Sep. 10, 1993 | [JP] | Japan | 5-226100 |
| Sep. 10, 1993 | [JP] | Japan | 5-226101 |
| Sep. 10, 1993 | [JP] | Japan | 5-226102 |
| Sep. 10, 1993 | [JP] | Japan | 5-226103 |
| Apr. 12, 1994 | [JP] | Japan | 6-083479 |

[51] Int. Cl.⁶ .................... F02N 17/00; F02M 41/00
[52] U.S. Cl. .................. 123/179.17; 123/456; 123/516
[58] Field of Search ............... 123/179.17, 514, 123/456, 506, 516, 497

[56] References Cited

U.S. PATENT DOCUMENTS

| 3,614,945 | 10/1971 | Schlagmuller | 123/179.17 |
| 4,329,951 | 5/1982 | Seilly | 123/179.17 |
| 4,403,580 | 9/1983 | Bader | 123/198 DB |
| 4,984,554 | 1/1991 | Ariga | 123/514 |
| 5,284,120 | 2/1994 | Fukoshima | 123/510 |
| 5,373,829 | 12/1994 | Schuers | 123/514 |
| 5,425,342 | 6/1995 | Ariga | 123/514 |

FOREIGN PATENT DOCUMENTS

| 3147467 | 4/1983 | Germany . |
| 3914939 | 11/1990 | Germany . |
| 4025641 | 2/1991 | Germany . |

OTHER PUBLICATIONS

Patent Abstracts of Japan, vol. 12, No. 105 (M-681) Apr. 6, 1988 & JP-A-62 237 057 (Toyota Motor Corp.) Oct. 17, 1987—Abstract.

Patent Abstracts of Japan, vol. 17, No. 544 (M-1489) Sep. 30, 1993 & JP-A-05 149 168 (Fuji Heavy Ind. Ltd.) Jun. 15, 1993—Abstract.

Patent Abstracts of Japan, vol. 17, No. 517 (M-1481) Sep. 17, 1993 & JP-A-05 133 295 (Suzuki Motor Corp.) May 28, 1993—Abstract.

*Primary Examiner*—Carl S. Miller
*Attorney, Agent, or Firm*—Evenson, McKeown, Edwards & Lenahan, P.L.L.C.

[57] ABSTRACT

A fuel feeding system is provided for an internal combustion engine to permit appropriate feeding of fuel in accordance with the state of operation of the engine. A fuel line is arranged as a recirculation circuit between a fuel injector and a fuel tank. A low-pressure fuel pump is arranged in an upstream part of the fuel line. A high-pressure fuel pump is arranged between the fuel pump and the injector. A high-pressure regulator is arranged in a fuel line portion on a downstream side of the regulator to control the pressure of fuel delivered from the pump. A bypass line connects another fuel line portion on an upstream side of the regulator and the fuel line portion each other. A switching valve is arranged in the bypass line to open or close the same. A low-pressure regulator controls the pressure of fuel in the fuel line portion at a pressure lower than a control pressure set by the regulator while the switching valve is open. ECU is arranged to perform open/close control of the switching valve so that the switching valve is closed in an ordinary operation state of the engine but is opened in a specific operation state of the engine.

21 Claims, 13 Drawing Sheets

FIG. 3

| OPERATION MODE | | ENGINE SPEED (Ne) | STATE OF TIMER AFTER Ne>1000 | BYPASS VALVE | INJECTOR GAIN |
|---|---|---|---|---|---|
| STALLED | | — | — | CLOSED | — |
| START-UP(SPC) | | Ne<1000 | — | OPEN | LOW |
| | (SPC) | 1000≤Ne<2000 | COUNTING | OPEN | LOW |
| | (SPC) | 2000≤Ne | COUNTING | OPEN | LOW |
| OTHER | | — | ALREADY COUNTED | CLOSED | HIGH |
| | | — | — | CLOSED | HIGH |

FUEL FEEDING SYSTEM FOR INTERNAL COMBUSTION ENGINE

BACKGROUND OF THE INVENTION

1. Field of the Invention

This invention relates to a fuel feeding system for an internal combustion engine, and especially to a fuel injection system suitable for use in a cylinder injection internal combustion engine to permit injection of fuel at relatively high fuel pressure.

2. Description of the Related Art

As internal combustion engines of the type that fuel is injected within each cylinder, that is, as so-called cylinder injection internal combustion engines or direct injection internal combustion engines, diesel engines are known widely. In the field of spark ignition engines (hereinafter called "gasoline engine" because spark ignition engines are generally gasoline engines), those of the cylinder injection type have also been proposed in recent years.

In cylinder injection internal combustion engines, there is a tendency, with a view toward improving their performance and also reducing exhaust gas, to raise the fuel injection pressure so that fuel can be atomized as very fine droplets and the fuel injection cycle can be shortened. Further, engines equipped with a supercharging system require, upon supercharging, high fuel injection pressure corresponding to the pressure of the supercharging.

Fuel feeding systems in cylinder injection internal combustion engines are therefore constructed to successfully provide such high fuel injection pressure (for example, several tens atm or so).

For example, FIGS. 12 and 13 schematically illustrate the constructions of fuel feeding systems for internal combustion engines, which have heretofore been proposed as fuel feeding systems capable of providing such high fuel injection pressure.

Illustrated in FIGS. 12 and 13 are a fuel injector 1, a fuel tank 2, a fuel line 3 arranged between the fuel injector 1 and the fuel tank 2, a low-pressure fuel pump 4 arranged in an upstream portion of the fuel line 3, said upstream portion being on a side of the fuel tank 2, and a high-pressure fuel pump 5 arranged between the low-pressure fuel pump 4 and the fuel injector 1. Also depicted are fuel filters 6,7 arranged in an inlet portion of the fuel line 3, a check valve 8, a low-pressure regulator 9 as a low-pressure control means, and a high-pressure regulator 10 as a high-pressure control means. Further, FIG. 13 also shows a cylinder 21, a piston 22, a piston rod 22A, a crankshaft 23, a combustion chamber 24, a cylinder head 25, an intake passage 26, a spark plug 27, and an exhaust passage 28.

According to each of such fuel feeding systems, the fuel which has been pressurized to a certain extent by the low-pressure fuel pump 4 is pressurized further by the high-pressure fuel pump 5 so that the pressure of the fuel is raised to a predetermined level. Here, the delivery pressure from the low-pressure fuel pump 4 is stabilized within a predetermined range by the low-pressure regulator 9 while delivery pressure from the high-pressure fuel pump 4 is stabilized within another predetermined range by the high-pressure regulator 10.

The prior art in which fuel pressurized by such a low-pressure fuel pump is pressurized further by a high-pressure fuel pump prior to feeding it to each fuel injector include, for example, the technique disclosed in Japanese Patent Application Laid-Open (Kokai) No. SHO 62-237057. According to this technique, a high fuel injection pressure can be provided in an operation range of high intake air pressure but in an operation range of low intake air pressure, the fuel injection pressure is held low to reduce the load on a high-pressure fuel pump.

Further, a technique on fuel injection control in a spark ignition, cylinder and direct injection internal combustion engine is disclosed, for example, in Japanese Patent Application Laid-Open (Kokai) No. HEI 4-183948. This technique is intended to increase the dispersibility of fuel and hence to promptly form a desired air-fuel mixture upon starting an engine at low temperatures by intermittently injecting the fuel in plural divided portions through an injector.

According to the technique disclosed in the above-referred Japanese Patent Application Laid-Open (Kokai) No. SHO 62-237057 referred to above, the pressure of fuel delivered from the high-pressure fuel pump is regulated by opening or closing a regulator not only when high-pressure fuel injection is needed but also when low-pressure fuel injection is needed. If the high-pressure fuel pump fails to operate fully, this high-pressure fuel pump interferes with force feeding by the low-pressure fuel pump, leading to the potential problem that the fuel pressure may not be regulated by the regulator to a fuel injection pressure corresponding to a desired operation range.

As the fuel pumps described above, it may be considered to adopt either engine-driven pumps or electric pumps. Adoption of an electric pump as a high-pressure pump however results in a lowered pump efficiency and higher manufacturing cost. It is therefore considered general to adopt an engine-driven pump as the high-pressure fuel pump. On the other hand, adoption of an electric pump as a low-pressure pump can make use of the merits of the electric pump that the above-described inconveniences in pump efficiency and manufacturing cost are reduced and stable delivery pressure can be obtained. It is hence considered reasonable to adopt an electric pump as the high-pressure pump.

However, the delivery pressure of an engine-driven pump is proportional to the engine speed. When an engine-driven pump is used as a high-pressure fuel pump, the delivery pressure of the high-pressure fuel pump is extremely low upon start-up of the engine because the engine speed is low at that time. The high-pressure fuel pump interposed between the low-pressure fuel pump and the fuel injector therefore conversely interferes with the flow of fuel so that the fuel pressure at the fuel injector may not reach even the level of a delivery pressure from the low-pressure fuel pump.

The technique disclosed in the above-referred Japanese Patent Application Laid-Open (Kokai) No. SHO 62-237057 therefore involves the potential problem that the fuel injection pressure of the fuel injector controlled by the regulator may not be raised a necessary level at the time of start-up of the engine and may not be controlled according to the operation range.

Further, the delivery pressure of an engine-driven pump is proportional to the engine speed. When an engine-driven pump is used as the high-pressure fuel pump, the delivery rate of the high-pressure fuel pump is substantially equal to the injection rate of fuel at low engine speeds but when the engine speed increases, the volumetric efficiency of the high-pressure fuel pump increases and its delivery rate may become too much. In the case of a low-pressure fuel pump making use of an electric pump, on the other hand, the delivery rate does not depend on the engine speed, and the pump is generally set at a delivery rate somewhat greater than a maximum fuel injection quantity, that is, (the maximum fuel injection quantity+α, α>0) so that the maximum fuel injection quantity can be assured.

Accordingly, the delivery rate of the high-pressure fuel pump becomes greater than that of the low-pressure fuel pump at a high engine speed, leading to the potential problem that the pressure of fuel at the inlet of the high-pressure fuel pump may drop and cavitation may occur there.

Such cavitation is not preferred for the injection of fuel and moreover, may damage the pump, fuel line and injector.

In an automotive internal combustion engine, for example, vapor (bubbles) tends to occur in the fuel line 3 due to a temperature increase in an engine compartment (bay) as a result of inactivation of an engine cooling system after the engine is stopped and/or due to leakage of fuel at the pressure regulators 9,10 and the fuel injector 1. When the driver subsequently attempts to start the engine, feeding of fuel is started with the vapor contained in the fuel line 3.

In the conventional multipoint injection (MPI) or the like, the pressure of fuel fed to the fuel injector 1 is not very high and a pressure regulator arranged downstream the fuel injector 1, said pressure regulator corresponding to the pressure regulator 10 in the above-described fuel feeding system, or the like has a low preset pressure. The fuel pressure promptly reaches this preset pressure subsequent to start-up of the engine so that the fuel inside the fuel line 3 on a side of the fuel injector 1 is allowed to flow out of the pressure regulator in a short time. The vapor in the fuel is therefore caused to flow away along with the fuel.

However, when the pressure of the fuel to be fed to the fuel injector 1 is substantially higher than that in the conventional multipoint injection (MPI) or the like, the preset pressure of the pressure regulator 10 is high. Until the fuel pressure reaches this preset pressure, the fuel in the fuel line 3 on the side of the fuel injector 1 is not allowed to flow out of the pressure regulator in a short time. The vapor in the fuel therefore remains together with the fuel on the side of the fuel injector 1 and accordingly, is not caused to flow away promptly.

Incidentally, it is generally common to any pump that a certain time is needed until the fuel pressure reaches a high preset pressure. In a fuel feeding system of such a construction as described above, however, it takes a substantial time for the below-described reason until the fuel pressure increases to a high level.

It may be considered to employ either an engine-driven pump or an electric pump as each of the fuel pumps 4,5. Use of an electric pump as the high-pressure pump however leads to lower pump efficiency and higher manufacturing cost. It is therefore considered common to employ an engine-driven pump as the high-pressure fuel pump 5. Use of an electric pump as a low-pressure pump can reduce the above-mentioned inconvenience in pump efficiency and manufacturing cost and can make use of the advantage of an electric pump that a stable delivery pressure can be obtained. It is therefore considered to employ an electric pump as the low-pressure fuel pump 4.

Since the delivery pressure of an engine-driven pump is proportional to the engine speed, use of the engine-driven pump as the high-pressure fuel pump 5 however results in a low engine speed and hence an extremely low delivery pressure of the high-pressure pump at the time of start-up of the engine so that the fuel pressure does not rise promptly.

The vapor in the fuel therefore is not caused to promptly flow out of the fuel injector 1. Such vapor, which remains around the fuel injector 1, leads to a delay or scattering in the rise of the pressure of the fuel to be injected or causes injection without fuel from the fuel injector 1, so that the control of the fuel injection is rendered difficult. It is therefore not preferred to use an engine-driven pump as the high-pressure fuel pump 5.

Taking elimination of such vapor from fuel in a broad sense, the related art is found, for example, in Japanese Utility Model Application Laid-Open (Kokai) NO. HEI 4-107474 which discloses the provision of an air vent hole in a fuel line immediately downstream a fuel filter. Further, Japanese Utility Model Application Laid-Open (Kokai) No. HEI 2-145657, for example, discloses a fuel feeding system which comprises a fuel injection pump and also an air-venting fuel pump arranged in series with the fuel injection pump. Also arranged is a bypass fuel line which circumvents the fuel injection pump. A check valve is arranged in the bypass line so that fuel is allowed to flow only in a direction from the side of a fuel injector toward the air-venting fuel pump.

None of these techniques is however directed to a fuel feeding system which is provided with a high-pressure regulator on a downstream side of a fuel injector and features high fuel pressure, so that it is difficult to eliminate the above-mentioned vapor from fuel present at the fuel injector 1.

SUMMARY OF THE INVENTION

This invention has been created in view of the Various problems described above. An object of this invention is to dissolve such problems either wholly or in part and to achieve a necessary fuel pressure as promptly as possible and also stably in a fuel feeding system for an internal combustion engine in which fuel is injected at high fuel pressure, so that the reliability of the system can be improved.

To achieve the above object, the following specific objects have been chosen. The present invention is intended to attain one or more of these objects.

(1) To permit good burning in an internal combustion engine by making it possible to obtain a predetermined fuel pressure even when the delivery pressure of a high-pressure fuel pump is not sufficient, for example, at the time of start-up of the internal combustion engine.

(2) To permit prompt elimination of vapor from fuel present around a fuel injector at the time of start-up of the internal combustion engine.

(3) To permit prevention of occurrence of cavitation at an inlet of the high-pressure fuel pump by making it possible to minimize a drop in the pressure of fuel present there.

(4) To permit prevention of occurrence of vapor in fuel around the fuel injector after the internal combustion engine is stopped.

To attain one or more of such specific objects, a fuel feeding system according to this invention for an internal combustion engine comprises the following elements:

a fuel line arranged between a fuel injector, disposed in the internal combustion engine, and a fuel tank and formed as a recirculation circuit extending from said fuel tank to said fuel injector and then returning from said fuel injector to said fuel tank;

a low-pressure fuel pump arranged in an upstream part of said fuel line;

a high-pressure fuel pump arranged in said fuel line between said low-pressure fuel pump and said fuel injector;

high-pressure control means arranged in a fuel line portion on a downstream side of said high-pressure fuel pump to control the pressure of fuel delivered from said high-pressure fuel pump;

a first bypass line connecting another fuel line portion on an upstream side of said high-pressure control means and said fuel line portion on the downstream side of said high-pressure control means to each other;

a switching valve arranged in said bypass line to open or close said bypass line;

low-pressure control means for controlling the pressure of fuel in said upstream-side fuel line portion of said first bypass line at a pressure lower than a control pressure set by said high-pressure control means while said switching valve is open; and control means for performing open/close control of said switching valve so that said switching valve is closed in an ordinary operation state of said internal combustion engine but is opened in a specific operation state of said internal combustion engine said specific operation including at least an operation state at a start-up of said internal combustion engine.

In another aspect of the present invention, a fuel feeding system comprises:

a fuel line formed as a recirculation circuit so that said fuel line communicates at one end thereof to a fuel tank and returns at an opposite end thereof to said fuel tank;

a low-pressure fuel pump arranged in an upstream part of said fuel line;

a high-pressure fuel pump arranged on a downstream side of said low-pressure fuel pump;

high-pressure control means arranged on a downstream side of said high-pressure fuel pump;

a fuel injection line communicating at one end thereof to said recirculation circuit at a point between said high-pressure pump and said high-pressure control means and at an opposite end thereof to said fuel tank via a fuel injector;

a switching valve arranged in said fuel injection line on a downstream side of said fuel injector to open or close said fuel injection line;

low-pressure control means for controlling the pressure of fuel in said fuel injection line on an upstream side of said switching valve at a pressure lower than a control pressure set by said high-pressure control means while said switching valve is open; and control means for performing open/close control of said switching valve so that said switching valve is closed in an ordinary operation state of said internal combustion engine but is opened in a specific operation state of said internal combustion engine, said specific operation including at least an operation state at a start-up of said internal combustion engine.

Owing to the above-described construction, the present invention can achieve appropriate feeding of fuel in accordance with the state of operation of the internal combustion engine so that a desired fuel pressure can be achieved promptly and stably.

BRIEF DESCRIPTION OF THE DRAWINGS

FIG. 3 is a table illustrating various control zones for the fuel feeding system according to the first embodiment for the internal combustion engine;

DESCRIPTION OF THE PREFERRED EMBODIMENTS

Figure 1:
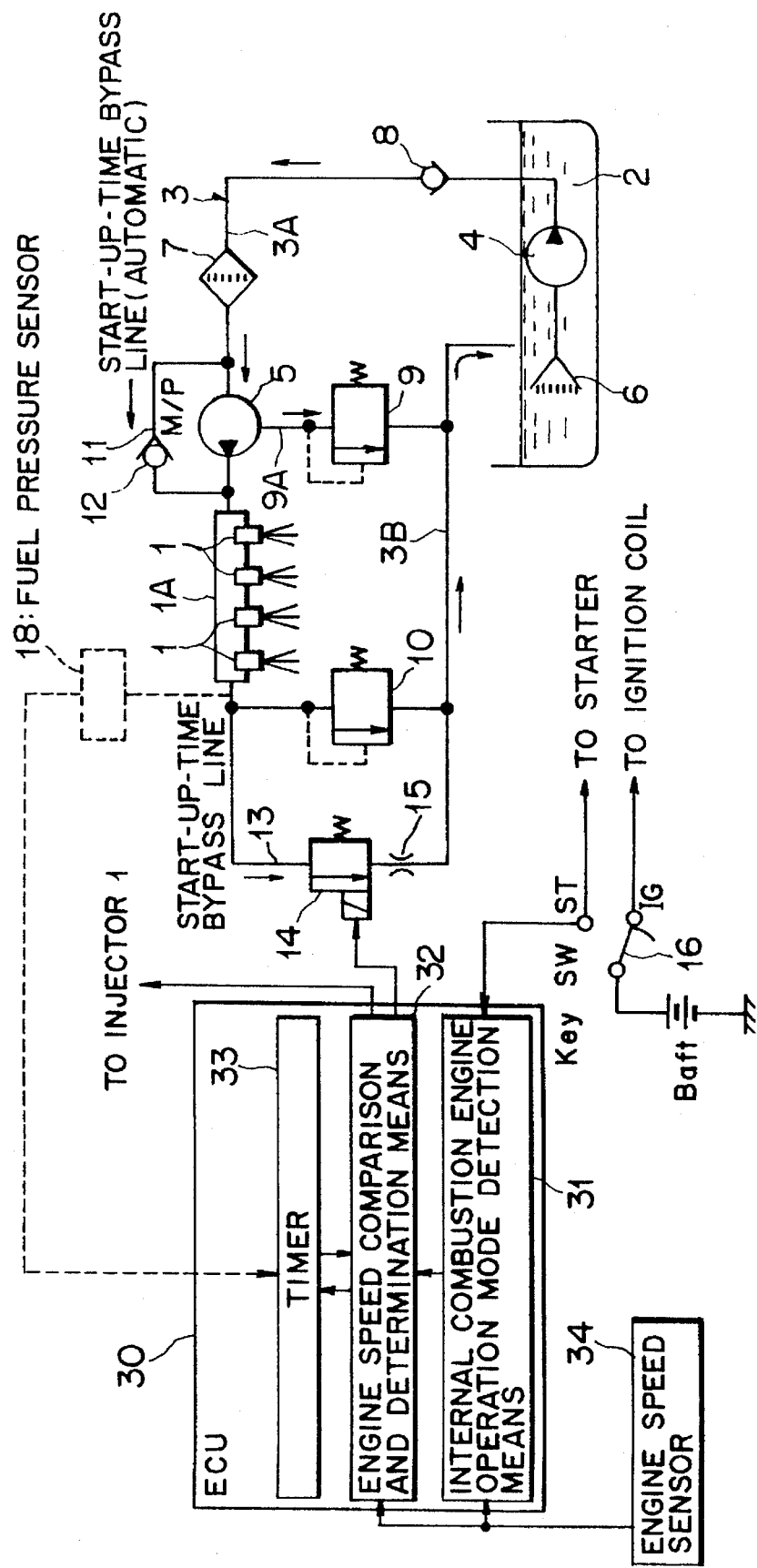
FIG. 1 is a simplified block diagram of a fuel feeding system according to a first embodiment of this invention for an internal combustion engine.

A description will first be made of the first embodiment. The fuel feeding system according to the first embodiment is arranged in a 4-cycle gasoline engine, especially, a cylinder injection gasoline engine of the type that fuel is directly injected into each cylinder. As is illustrated in FIG. 1, a low-pressure fuel pump (feed pump) 4 and a high-pressure fuel pump 5 are arranged in a fuel line 3 which extends between fuel injectors (injectors; hereinafter collectively called "the fuel injector") 1 and a fuel tank 2.

The fuel line 3 is composed of a feed line 3A for feeding fuel from the fuel tank 2 to the fuel injector 1 and a return line 3B for returning fuel, which has not been injected by the fuel injector 1, to the fuel tank 2. Although the fuel injector 1 is also fed with fuel through a delivery pipe 1A, this delivery pipe 1A itself will be considered as a part of the fuel line 3 herein.

The fuel injector 1 is computer-controlled in operation by an electronic control unit (ECU, hereinafter called "the controller") 30 as control means. Described specifically, the controller 30 excites the fuel injector 1 by a pulse current to perform fuel injection so that fuel can be injected at a desired timing and in a desired quantity in accordance with information such as the engine speed Ne and the quantity of inducted air.

This timing of fuel injection is set based on a crank angle. As a matter of fact, however, there is a delay in response from excitation of the fuel injector 1 until actual injection of fuel (this is called an "injector dead time"). The timing of fuel injection is therefore set by taking it into consideration. The quantity of fuel to be injected is set by the width of the pulse current. This pulse width is set as an injector gain which corresponds to a target quantity of fuel to be injected.

Figure 13:
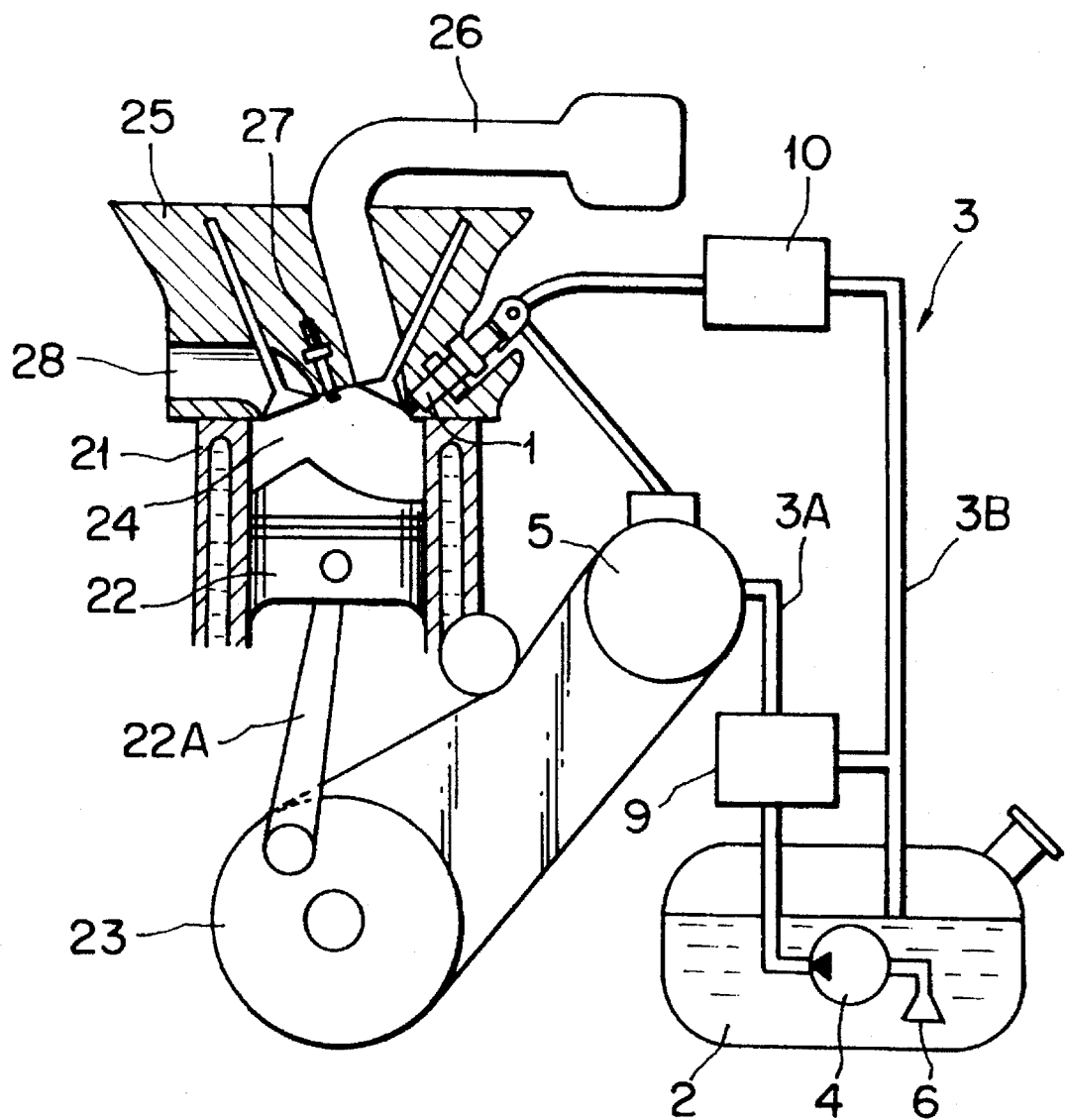
FIG. 13 is a simplified diagram showing a relationship between certain essential elements of a conventional illustrative internal combustion engine and an engine.

The relationship between essential elements of the fuel feeding system for the internal combustion engine and the internal combustion engine is substantially the same as the conventional fuel feeding system depicted in FIG. 13 so that its description is omitted herein.

The low-pressure fuel pump 4 is a feed pump which is located inside the fuel tank 2 and is inserted in an upstream part of the feed line 3A of the fuel line 3. An electric pump is employed as the low-pressure fuel pump 4. When operated, the low-pressure fuel pump 4 feeds the fuel from the fuel tank 2 toward a downstream side of the feed line 3A while filtering it through a fuel filter 6. The pressurization of the fuel by the low-pressure fuel pump 4 at this time is performed from the level of the atmospheric pressure to several atm or so. Further, the low-pressure fuel pump 4 is arranged so that it begins to operate concurrently with start-up of the engine and stops when the engine is turned off. Needless to say, the low-pressure fuel pump 4 can produce a desired delivery pressure irrespective of the engine speed.

The high-pressure fuel pump 5 pressurizes the fuel, which has been delivered from the low-pressure fuel pump 4, to several tens atm or so. In the feed line 3A from the low-pressure fuel pump 4 to the high-pressure fuel pump 5, a check valve 8 and a fuel filter 7 are inserted. The delivery pressure of the low-pressure fuel pump 4 is maintained by the check valve 8 and the fuel is filtered further by the fuel filter 7. Employed as the high-pressure fuel pump 5 is an engine-driven pump, such as a reciprocating compression pump, which is more advantageous than an electric pump. Obviously, the engine-driven pump operates in direct association with operation of the engine and produces a delivery pressure in proportion to the engine speed.

Figure 2:
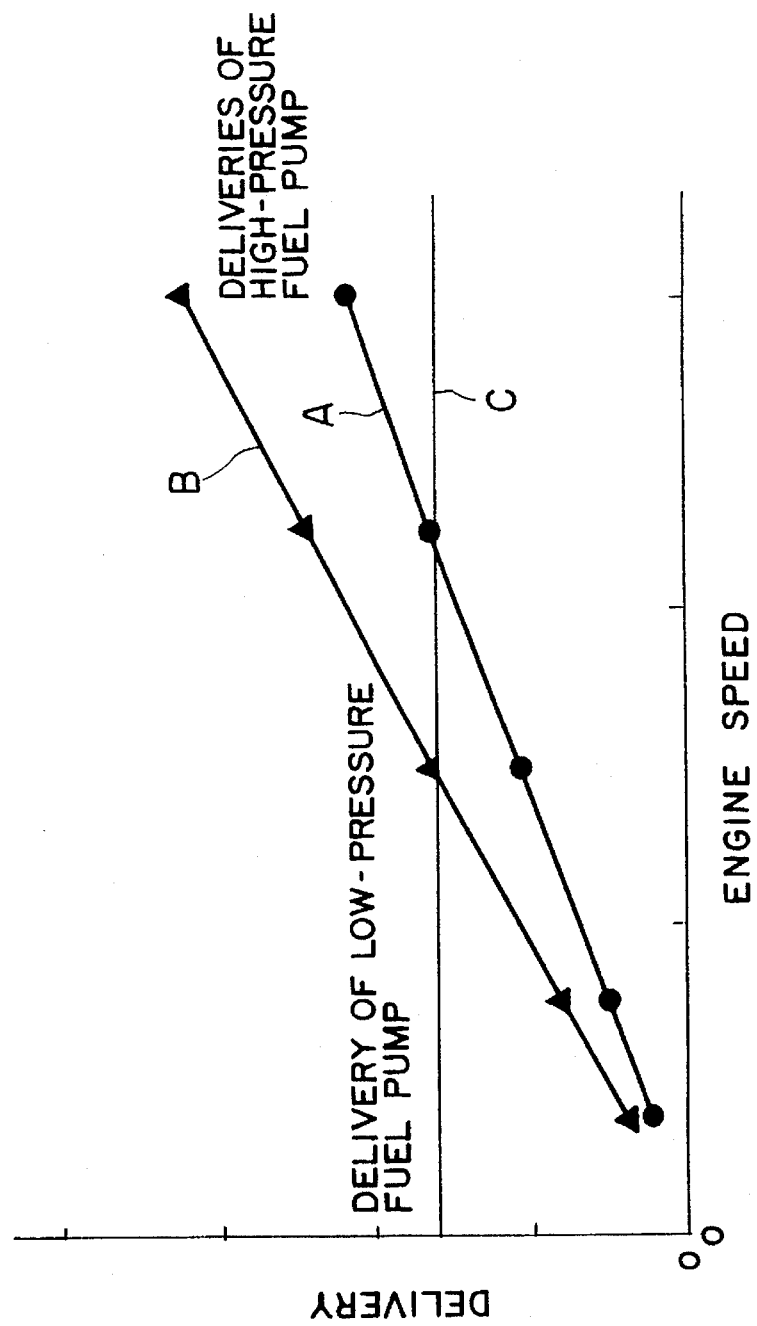
FIG. 2 is a diagram showing output characteristics of fuel pumps in the fuel feeding system according to the first embodiment for the internal combustion engine.

Output characteristics (discharge flow rate) of the fuel pumps 4,5 under the condition that the delivery pressure is held constant can be illustrated as shown in FIG. 2. Described specifically, lines A and B indicate the delivery flow rate characteristics of the high-pressure fuel pump 5 while line C designates the delivery flow rate characteristics of the low-pressure fuel pump 4. In the cases of the lines A and B, the lifting distance of a cam which takes part in driving the high-pressure fuel pump 5 is set at different values. Compared with the case of the line A, the lifting distance of the cam is greater in the case of the line B, resulting in a greater pump output. The actual delivery pressures of the fuel pumps 4,5 are determined by such delivery flow rate characteristics and also by flow resistances such as a low-pressure regulator 9 as low-pressure control means and a high-pressure regulator 10 as high-pressure control means, said control means being to be described subsequently herein, so that the delivery flow rate characteristics shown in the diagram cannot be taken directly as delivery pressure characteristics. Nevertheless, the delivery pressure characteristics substantially correspond to the delivery flow rate characteristics. From FIG. 2, too, it is therefore appreciated that the low-pressure fuel pump 4 of the electric type can produce a predetermined constant delivery pressure (delivery flow rate) without relying upon the engine speed while the high-pressure fuel pump 5 of the engine-driven type produces a delivery pressure (delivery flow rate) in proportion to the engine speed.

Between the feed line 3A and the return line 3B of the fuel line 3, described specifically, between a part of the feed line 3A, said point being on a downstream side of the fuel filter 7 but on an upstream side of the high-pressure fuel pump 5, and a most downstream part of the return line 3B, a branch line 9A is arranged. Arranged in this branch line 9A is the low-pressure regulator 9 for controlling the delivery pressure from the low-pressure fuel pump 4 to a preset pressure (for example, 3 atm). This low-pressure regulator 9 remains closed until the delivery pressure from the low-pressure fuel pump 4 exceeds the preset pressure (for example, 3 atm) but when the delivery pressure exceeds the preset pressure, the low-pressure regulator 9 causes the fuel corresponding to this excess pressure to return directly to the side of the fuel tank 2, whereby the pressure of the fuel to be fed to the high-pressure fuel pump 5 can be stabilized around the preset pressure. To provide the preset pressure described above, the low-pressure fuel pump 4 is of course set in such a way that its delivery pressure becomes at least equal to the preset pressure.

At a position immediately downstream the fuel injector 1, namely, in a most upstream part of the return line 3B of the fuel line 3, the high-pressure regulator 10 is arranged to control the delivery pressure from the high-pressure fuel pump 5 to a preset pressure (for example, 50 atm). This high-pressure regulator 10 remains closed until the delivery pressure from the high-pressure fuel pump 5 exceeds the preset pressure (for example, 50 atm) but when the delivery pressure exceeds the preset pressure, the high-pressure regulator 10 causes the fuel corresponding to this excess pressure to return to the side of the fuel tank 2, whereby the pressure of the fuel at the fuel injector 1 can be stabilized at a predetermined pressure.

Further, this fuel feeding system is also provided with a bypass line (hereinafter called "the second bypass line") 11 which connects an upstream-side part and a downstream part of the feed line 3A, both relative to the high-pressure fuel pump 5, with each other so that the fuel flowing through the feed line 3A of the fuel line 3 can be fed to the fuel injector 1 while bypassing the high-pressure fuel pump 5. Arranged in the second bypass line 11 is a check valve 12 which allows the fuel to pass only from an upstream side to a downstream side of the feed line 3A. When the high-pressure fuel pump 5 does not operate fully and the fuel pressure is lower on the downstream side than the upstream side relative to the high-pressure fuel pump 5, the check valve 12 opens the second bypass line 11. When the high-pressure pump 5 operates fully and the fuel pressure is higher on the downstream side than the upstream side relative to the high-pressure fuel pump 5, the check valve 12 closes the second bypass line 11.

The fuel feeding system is also provided with another bypass line (hereinafter called "the first bypass line") 13 which connects an upstream-side part and a downstream part of the return line 3B, both relative to the high-pressure regulator 10, with each other so that the fuel present at the fuel injector 1 can be discharged to the side of the fuel tank 2 while bypassing the high-pressure regulator 10. This first bypass line 13 is to set the pressure of the fuel in the delivery pipe 1A at low pressure and also to cause vapor (bubbles), which are contained in the fuel line 3 at a position near the fuel injector 1, to flow away in an initial stage after start-up of the engine. Arranged therefore in the first bypass line 13 are an electromagnetic directional control valve 14 and a fuel pressure holding means 15. The electromagnetic directional control valve 14 opens or closes the first bypass line 13. The fuel pressure holding means 15 is formed of an orifice and can hold the pressure of the fuel, which is present at the fuel injector 1, at a predetermined pressure. When operation of the high-pressure fuel pump 5 is insufficient, the electromagnetic directional control valve 14 is opened owing to the provision of the fuel pressure holding means 15 so that the fuel pressure inside the delivery pipe 1A is set somewhat lower than the fuel pressure set by the low-pressure regulator 9.

When energized and actuated, the electromagnetic directional control valve 14 opens the first bypass line 13 but when deenergized and rendered out of actuation, the electromagnetic directional control valve 14 closes the first bypass line 13. By the controller 30, the electromagnetic directional control valve 14 is ON/OFF controlled. 10 The controller 30 controls the electromagnetic directional control valve 14 so that the valve 14 is opened in a specific operation state but is closed in an ordinary operation state. As is illustrated in FIG. 3, the operation of the electromagnetic directional control valve 14 is specified based on the engine speed Ne from an engine speed sensor 34 as engine speed detection means and the time (timer count). Its control is performed based on the result of detection of a start-up operation mode by internal combustion engine operation mode detection means 31 for detecting an operation mode of the internal combustion engine, the result of a comparison by an engine speed comparison and determination means (Ne comparison and determination means) 32 and the state of a timer 33. Incidentally, each abbreviation (spc) described in the column "Operation mode" in FIG. 3 indicates a specific operation state.

As is shown in FIG. 3, the electromagnetic directional control valve 14 is closed when the engine is stalled (i.e., stopped). In the start-up operation mode, the electromagnetic directional control valve 14 is opened to set an injector gain of a low pressure mode. Although not shown in FIG. 3, the injector dead time is also set in a low pressure mode.

Incidentally, this start-up mode can be determined, for example, based on the engine speed. If the engine speed Ne is lower than a predetermined value (for example, 430 rpm) (i.e., Ne<430) after an ignition key switch 16 has been manipulated to a starter position and a start-up operation has been initiated, the engine is determined to be in the start-up mode. When the engine speed Ne has become equal to or higher than another predetermined value $N_0$ (i.e., $430 \leq Ne$), the engine is determined to have departed from the start-up mode.

When the engine has departed from this start-up operation mode (in other words, has entered another operation mode), the operation state can be classified into two cases, namely, the case in which the engine speed Ne has not reached a first reference engine speed (1,000 rpm in the illustrated embodiment) [Ne<1,000] and the case in which the engine speed Ne has reached the first reference engine speed (1,000 rpm) [$1,000 \leq Ne$].

Further, when the engine speed Ne has reached the first reference engine speed (1,000 rpm) [$1,000 \leq Ne$], counting by the timer 33 is started at the same time as the engine speed has reached the reference speed. If the state of this engine speed Ne which has reached the first reference engine speed is maintained, the timer 33 is allowed to continue counting until the count of the timer reaches a predetermined value (in other words, until a preset time elapses).

When the engine speed Ne has reached the first reference engine speed ($1,000 \leq Ne$), the operation mode can therefore be classified into two cases, one continuing until the timer count reaches a predetermined value (namely, during counting) and the other after the timer count has reached the predetermined value (namely, after the timer has already counted the predetermined value).

After the timer count has reached the predetermined value (namely, after the timer has already counted the predetermined value), the electromagnetic directional control valve 14 is closed to set an injector gain of a high pressure mode and although not illustrated in FIG. 3, the injector dead time is also set in a high pressure mode.

When the engine speed Ne has reached the first reference engine speed but the timer is still counting, on the other hand, the operation mode can be classified into two cases, one continuing while the engine speed Ne has not reached the second reference engine speed (2,000 rpm in the illustrated embodiment) ($1,000 \leq Ne \leq 2,000$) and the other after the engine speed Ne has reached the second reference engine speed ($2,000 \leq Ne$).

Where the engine speed Ne has not reached the second reference engine speed ($1,000 \leq Ne < 2,000$), the engine is maintained in a similar state to the state of the engine in the start-up operation mode, namely, the electromagnetic directional control valve 14 is opened so that the injector gain remains in the state set in the low pressure mode. Further, although not shown in FIG. 3, the injector dead time remains to be set in the low pressure mode.

When the engine speed Ne has reached the second reference engine speed ($2,000 \leq Ne$), the electromagnetic directional control valve 14 is closed even if the predetermined time has not elapsed (in other words, the timer is still counting), so that the injector gain of the high pressure mode is set and although not shown in FIG. 3, the injector dead time is set in a high pressure mode.

It is to retain a flow passage on the downstream side of the injector 1 for fuel, which is to be delivered from the low-pressure fuel pump 4, at the time of start-up to permit stable flow of the fuel at a low pressure and hence to cause vapor (bubbles), said vapor being contained in the fuel line 3 in the vicinity of the injector 1 to flow away by the flow of the fuel in an initial stage after the start-up of the engine that the specific operation state is set as described above to open the electromagnetic directional control valve 14 and to set the injector gain and the injector dead time in the low pressure modes, respectively.

It is therefore desired to increase the fuel pressure as promptly as possible after start-up so that the fuel can be injected at a high pressure. The high-pressure fuel pump 5 is however driven by the engine, so that until the engine speed increases, the delivery pressure of the high-pressure fuel pump 5 cannot be increased and the fuel cannot be injected at a high pressure. In some instances, the high-pressure fuel pump 5 may conversely interfere with the delivery of fuel by the low-pressure fuel pump 4. To cope with this potential problem, the second bypass line 11 and the check valve 12 are arranged as described above.

Unless the delivery pressure of the high-pressure fuel pump 5 increases as described above, the high-pressure regulator 10 disposed downstream the injector 1 prevents the flow of fuel so that the fuel cannot be fed in a sufficient quantity at a low pressure, thereby failing to cause vapor, which is contained around the injector 1, to flow away. Hence, the electromagnetic directional control valve 14 is opened to open the first bypass line 13. This makes it possible to retain a fuel passage on the downstream side of the injector 1, whereby the fuel can be fed in a sufficient quantity at a low pressure and vapor, which is contained around the injector 1, can be caused to flow away.

Further, the fuel pressure holding means 15 is disposed to hold a predetermined fuel pressure (a low fuel pressure set by the low-pressure regulator 9) even after the first bypass line 13 has been opened.

As soon as the delivery pressure of the high-pressure fuel pump 5 is increased, it is desired to achieve fuel injection at a high pressure as intended. An increase in the delivery pressure of the high-pressure fuel pump 5, however, corresponds to an increase in the engine speed and also to an elapsed time. Described specifically, when the engine speed increases sufficiently, the delivery pressure from the high-pressure fuel pump 5 increases obviously. When the engine speed increased to a certain extent although this increase is not sufficient, the delivery pressure of the high-pressure fuel pump 5 increases depending on a time during which this state is maintained. Accordingly, as described above, the second reference engine speed is set as a reference indicating a sufficient increase in the engine speed, the first reference engine speed is set as a reference indicating an engine speed which has increased to a certain extent although this increase is not sufficient, and further, a reference time (preset time) is determined to indicate a time in which the delivery pressure of the high-pressure fuel pump 5 would increase in this state (that is, the state in which the engine speed has reached the first reference engine speed).

As the fuel feeding system according to the first embodiment of the present invention for the internal combustion engine is constructed as described above, the operation of control of fuel feeding by the system can be conducted in the manner to be described below.

Figure 4:
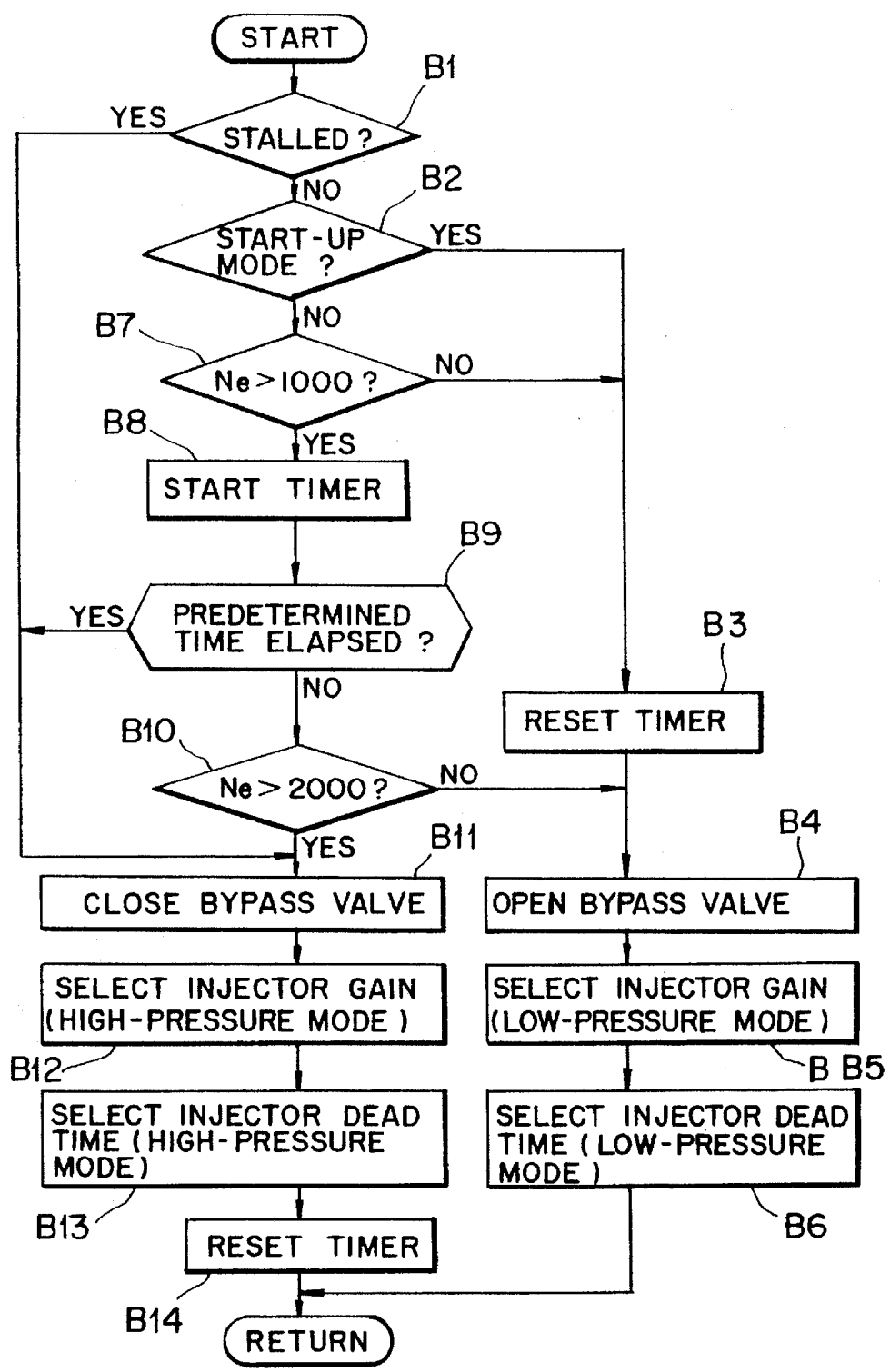
FIG. 4 is a flow chart describing an operation (fuel feeding method) of the fuel feeding system according to the first embodiment of this invention for the internal combustion engine.

Namely, as is illustrated in FIG. 4, it is first determined whether or not the engine is in a stalled state (step B1). If not in the stalled state, it is next determined whether or not the ignition key switch 6 has been set to the starter-on position (step B2). When the ignition key switch 16 has been set to the starter-on position, the start-up operation mode is started to reset the timer to 0 (step B3).

At this time, the engine is started up (namely, cranked), and the low-pressure fuel pump 4 and the high-pressure fuel pump 5 are actuated. Concurrently with this, the controller 30 opens the electromagnetic directional control valve 14 (step B4) and operates the fuel injector 1 in a specific operation mode. Described specifically, the injector gain of the low-pressure mode is selected (step B5) and the injector dead time of the low-pressure mode is selected (step B6).

When the engine speed has exceeded a predetermined value (for example, 430 rpm), the start-up mode is determined to have ended so that the routine advances from step B2 to step B7 to initiate timer counting (step B8). Determination in step B9 is then conducted, in other words, it is determined whether or not the timer count has reached a predetermined value. Unless the timer count has reached the predetermined value, the routine advances to step B10, where it is determined whether or not the engine speed has exceeded the second reference engine speed (for example, 2,000 rpm).

Unless the engine speed has exceeded the second reference engine speed (for example, 2,000 rpm), the operations of steps B4 to B6 are continued until the timer count reaches the predetermined time (namely, the predetermined time elapses)—this situation corresponds to the first step of the fuel feeding method according to the present invention.

Figure 5:
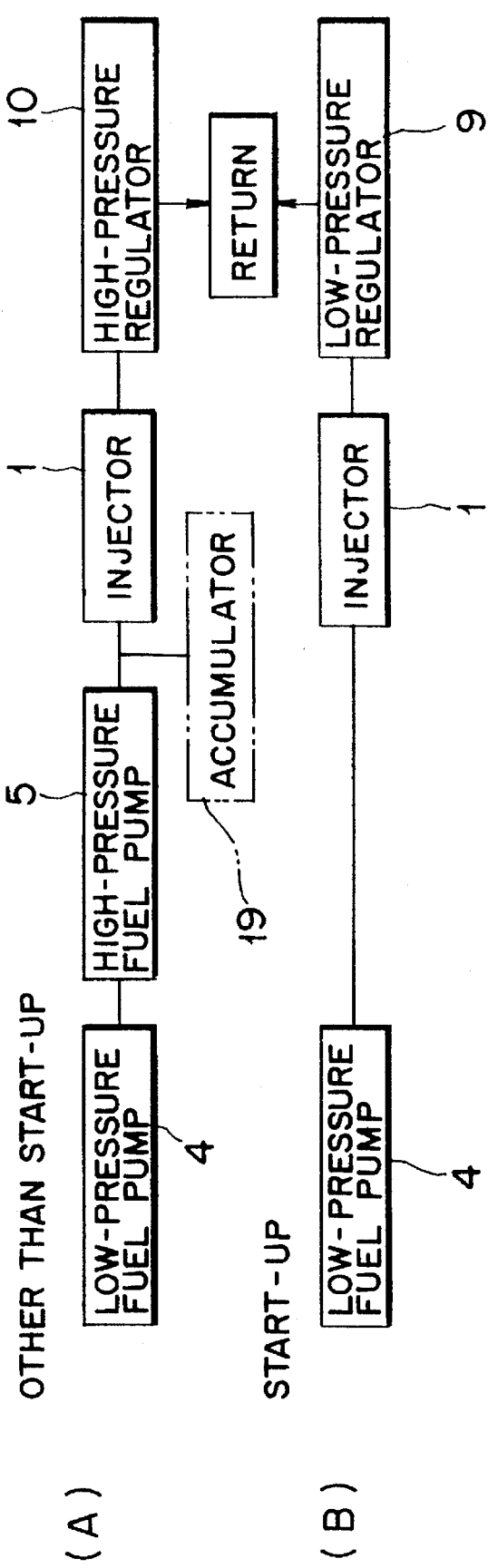
FIG. 5 is a diagram showing operations of the fuel feeding system according to the first embodiment of this invention for the internal combustion engine.

In this state, fuel—which was delivered from the low-pressure fuel pump (feed pump) 4 and has been controlled to a predetermined low pressure value by the downstream low-pressure regulator (low-pressure regulator) 9—is fed to the fuel injector 1 and any surplus fuel is returned to the fuel tank as illustrated under (B) in FIG. 5. As is indicated by line C in FIG. 2, the low-pressure fuel pump 4 is promptly brought into a delivery pressure state of a predetermined pressure (several atm) subsequent to the start-up. The high-pressure fuel pump 5 is however unable to produce a sufficient delivery pressure as shown in FIG. 2, because the engine speed remains low immediately after the start-up of the engine.

Immediately after the start-up of the engine, the high-pressure fuel pump 5 therefore rather functions as a resistance to the flow of fuel through the fuel line 3, said flow having been produced by a delivery pressure by the low-pressure fuel pump 4. According to the present system, however, the fuel is fed to the side of the fuel injector 1 through the second bypass line 11 arranged in parallel with the high-pressure fuel pump 5, so that from the fuel injector 1, the fuel can be injected at a pressure of the level controlled by the low-pressure regulator 9 or so.

In general, the quantity of fuel to be required for combustion is small immediately after start-up of an engine. Accordingly, the pulse width of fuel injection can be set short and moreover, it is sufficient to set the pulse timing of fuel injection in such a way that fuel injection is performed only in the intake stroke like the conventional multipoint injection (MPI). Since the fuel injection is hence performed by selecting the low-pressure mode injector gain and the low-pressure mode injector dead time, the engine speed can be smoothly increased even at a fuel pressure of the level controlled by the low-pressure regulator 9 or so provided that the fuel pressure remains stable.

As the engine speed rises, the delivery rate of the high-pressure fuel pump 5 therefore increases as indicated by line A or B in FIG. 2. As a consequence, the delivery pressure of the high-pressure fuel pump 5 smoothly increases. When the engine speed has exceeded the second reference engine speed (2,000 rpm) (this situation corresponds to the third step of the fuel feeding method of the present invention) or when the engine speed has not exceeded the second reference engine speed (2,000 rpm) but the first reference engine speed (1,000 rpm) has been exceeded and the predetermined time has elapsed (this situation corresponds to the second step of the fuel feeding method of the present invention), the routine advances from step B9 or step B10 to step B11, whereby the controller 30 closes the electromagnetic directional control valve 14 to drive the fuel injector 1 in the ordinary operation mode (i.e., the high-pressure mode). Namely, the injector gain of the high-pressure mode is selected (step B12) and the injector dead time of the high-pressure mode is selected (step B13). Then, the timer is reset to 0 (step B14). Insofar as the engine does not stop, the operations of steps B11 to B14 are then continued.

As a result, as illustrated under (A) in FIG. 5, the fuel—which had been delivered from the low-pressure fuel pump (feed pump) 4, was pressurized to a high pressure by the high-pressure fuel pump 15 and has then been controlled to a predetermined high pressure by the high-pressure regulator 10—is fed to the fuel injector 1 and any surplus fuel is returned to the fuel tank.

As a consequence, the delivery pressure of the high-pressure fuel pump 5 progressively increases the fuel pressure on the downstream side of the high-pressure fuel pump 5 without being lost, whereby the fuel pressure can be raised to the pressure set by the high-pressure regulator 10. Further, the selection of the high-pressure mode injector gain and the high-pressure injector dead time permits appropriate fuel injection.

The delivery pressure of the high-pressure fuel injection pump 5 therefore increases to a sufficient level, whereby the injection of fuel from the fuel injector 1 can be performed at a fuel pressure as high as the pressure set by the high-pressure regulator 10. The engine speed can therefore be smoothly raised from immediately after the start-up of the engine. It is therefore possible to provide such a high fuel injection pressure as required, for example, to shorten the fuel injection period (namely, the pulse width of fuel injection) or to meet a supercharging pressure upon supercharging in a cylinder injection internal combustion engine.

The electromagnetic directional control valve 14 which opens or closes the first bypass line 13 is closed after subsequent to start-up of the engine, a predetermined time (a relatively short time) has elapsed and the discharge of vapor has been fully conducted. After the closure, it therefore becomes possible to increase the fuel pressure to a pressure controlled by the high-pressure regulator 10, thereby making it possible to provide a sufficient fuel injection pressure, for example, during high-speed driving.

Depending on whether the fuel pressure is a high level or a low level, the fuel injector 1 is controlled at a corresponding optimum level. This always permits appropriate control of the fuel injection, contributing to an improvement in the engine performance.

Figure 6:
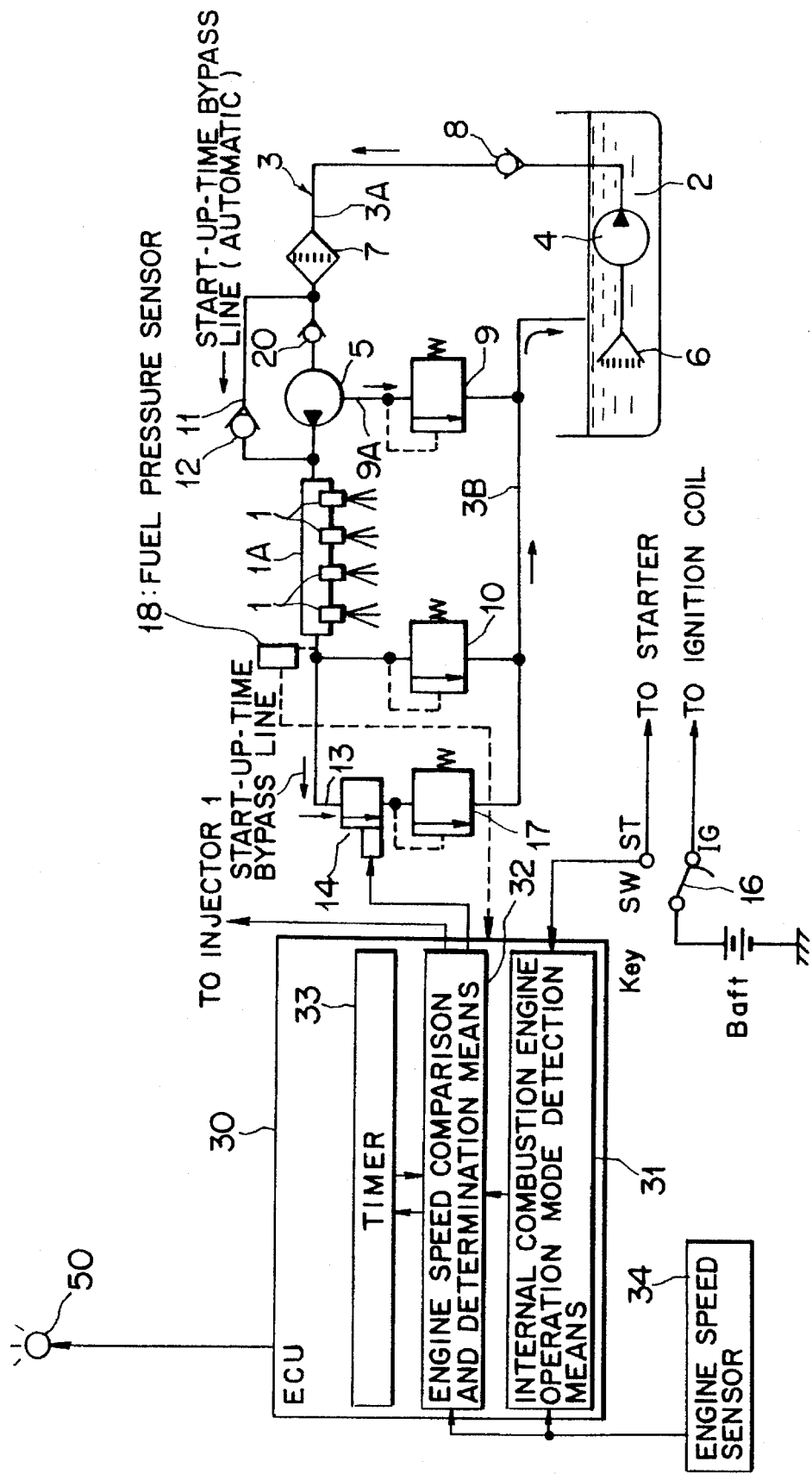
FIG. 6 is a simplified block diagram of a fuel feeding system according to a second embodiment of this invention for the internal combustion engine.

A description will next be made of the second embodiment. The fuel feeding system according to the second embodiment for an internal combustion engine is different from the first embodiment in the fuel pressure holding means as depicted in FIG. 6.

In the second embodiment, a low-pressure regulator 17 is arranged as the fuel pressure holding means in place of the fixed restrictor 15. This low-pressure regulator 17 has a preset pressure somewhat lower than the low-pressure regulator 9 so that it remains closed until the fuel pressure exceeds the preset pressure (for example, a pressure somewhat lower than 3 atm) but when the delivery pressure exceeds the preset pressure, returns the fuel to the side of the fuel tank 2 in a quantity corresponding to the extra pressure.

The second bypass line 11 and its check valve 12 as well as the first bypass line 13 and its electromagnetic directional control valve 14 are constructed as in the first embodiment.

Owing to the above construction, the fuel feeding system according to the second embodiment for the internal combustion engine can bring about similar action and effects to the first embodiment.

Incidentally, a fuel pressure sensor 18 may be arranged on a downstream side of the fuel injector 1 as indicated by dashed lines. If the fuel pressure detected by the fuel pressure sensor 18 becomes, for example, lower than a preset pressure range, leakage of the fuel is estimated, for example, due to breakage of a sealing portion of the fuel injector 1 or the pumping system or of the piping. If the fuel pressure detected by the fuel pressure sensor 18 becomes higher than the preset pressure range, on the other hand, one of the valves on the return line 3B, for example, the high-pressure regulator 10 or the electromagnetic directional control valve 14 is assumed to have been locked. It is contemplated that upon detection of a fault in the fuel feeding system, the controller 30 warns so to the driver by means of an alarm lamp 40 or an unillustrated alarm buzzer as alarming means or feeds the fault back for the control of the feeding of the fuel.

Described specifically, where a desired high-pressure state is not detected by the fuel pressure sensor 18 despite the electromagnetic directional control valve 14 has been closed and the fuel pressure is set at a high pressure, the electromgantic directional control valve 14 is opened to change the setting of the fuel pressure to the "low pressure" mode and the injector gain is also changed to the "low pressure" mode. If the high-pressure fuel pump 5 does not operate properly, the fuel pressure is lowered as described above so that the appropriate preset air/fuel ratio can be maintained.

In each of the first and second embodiments described above, the open/close control of the electromagnetic directional control valve 14 and the switching control on the low pressure/high pressure of the fuel injection can be performed by using only parts of the embodiment. Namely, (1) Until the engine speed reaches the first reference engine speed subsequent to departure from the start-up operation mode, the electromagnetic directional control valve 14 is opened to set the fuel injection in the low-pressure mode. (2) When subsequent to departure from the start-up operation mode, the engine speed reached the first reference engine speed and this state has continued for a predetermined time or longer, the electromagnetic directional control valve 14 is closed to set the fuel injection in the high-pressure mode. (3) When subsequent to departure from the start-up operation mode, the engine speed reached the first reference engine speed and has then reached the second reference engine speed higher than the first reference engine speed, the electromagnetic directional control valve 14 is closed to set the fuel injection in the high-pressure mode even if the engine speed between the first and second reference engine speeds does not continue for the preset time. It would also be possible to partly use these steps.

Further, it would also be possible to perform control of the feeding of air for combustion in place of or in addition to control of the feeding of fuel to the internal combustion engine, led by the control of fuel injection, so that a desired fuel/air ratio can be achieved.

Figure 7:
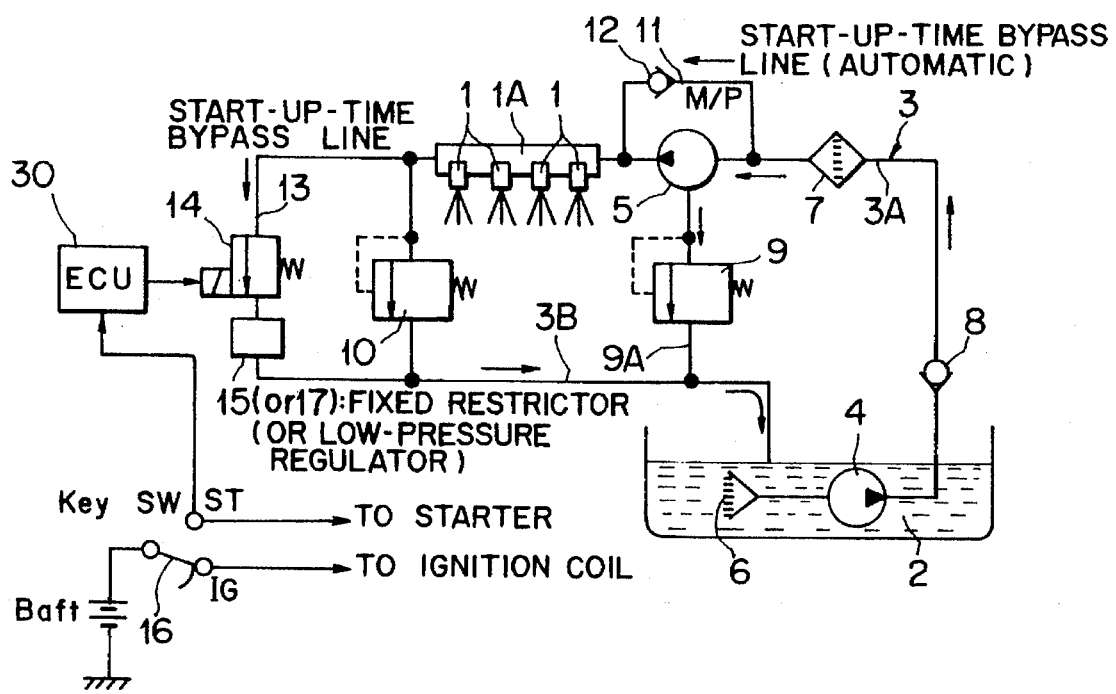
FIG. 7 is a simplified block diagram of a fuel feeding system according to a third embodiment of this invention for the internal combustion engine.

A description will next be made of the third embodiment. The fuel feeding system according to the third embodiment for an internal combustion engine is different from the first and second embodiments in the switching control of the electromagnetic directional control valve 14 as depicted in FIG. 7.

Described specifically, the electromagnetic directional control valve 14, when energized and actuated, opens the first bypass line 13 but when deenergized and rendered out of actuation, closes the first bypass line 13. The opening and closure of the electromagnetic directional control valve 14 is controlled by the controller 30. This controller 30 performs the control so that the electromagnetic directional control valve 14 is opened in a specific operation state but is closed in an ordinary operation state. In this case, the specific operation state corresponds to the time of start-up of the engine and is defined to continue from the time point of initiation of the start-up operation mode as a result of turning of the ignition key switch 16 until the time point of an elapse of a predetermined time (for example, 2 seconds or longer) after end of the start-up operation mode. The ordinary operation state, on the other hand, corresponds to the state after this predetermined time has elapsed. In the present embodiment, the electromagnetic directional control valve 14 is kept closed while the engine is stopped.

The controller 30 performs not only the open/close control of the electromagnetic directional control valve 14 but also drive control of the injector 1 as described above. This drive control is associated with the open/close control of the electromagnetic directional control valve 14, and drives the fuel injector 1 in a specific operation mode (low-pressure mode) in the specific operation state (namely, at the time of the above-described start-up of the engine, in other words, during the start-up mode and until the predetermined time is elapsed subsequent to departure from the start-up mode) but in an ordinary operation mode (high-pressure mode) in the ordinary operation state (namely, after the predetermined time has elapsed subsequent to departure from the start-up mode).

Drive of the fuel injector 1 is set separately depending on whether the operation mode is the specific operation mode or the ordinary operation mode as described above, because the quantity of fuel to be injected and the injector dead time vary depending on the fuel pressure. While the electromagnetic directional control valve 14 is opened in the specific operation mode, the fuel pressure has the value set by the low-pressure regulator valve but while the electromagnetic directional control valve 14 is closed in the ordinary operation mode, the fuel pressure has the value set by the high-pressure regulator. Depending on whether the electromagnetic directional control valve 14 is open or closed, the fuel pressure therefore varies. By setting the quantity of fuel to be injected and the injector dead time in accordance with the fuel pressure, it is therefore possible to achieve optimal fuel injection control.

Figure 8:
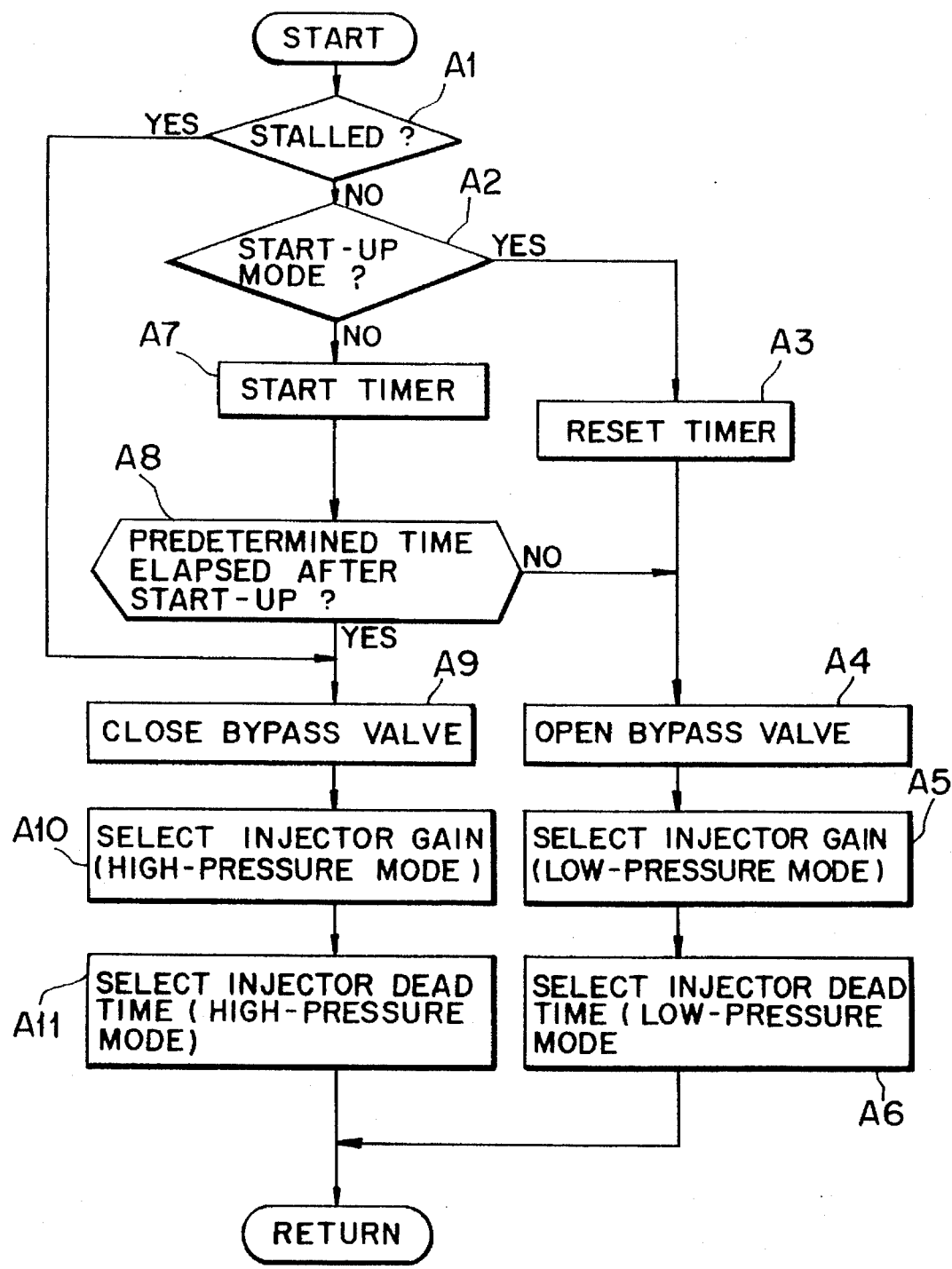
FIG. 8 is a flow chart describing an operation of the fuel feeding system according to the third embodiment of this invention for the internal combustion engine.

Because of the above construction, the fuel feeding system according to the third embodiment for the internal combustion engine can control the feeding of fuel, for example, as illustrated in FIG. 8.

It is first determined whether or not the engine is in a stalled state (step A1). Unless the engine is in the stalled state, it is then determined whether or not the ignition key switch 16 has been set to the starter-on position (step A2). When the ignition key switch 16 has been set to the starter-on position, the start-up operation mode is started to reset the timer to 0 (step A3).

At this time, the engine is started up (namely, cranked), and the low-pressure fuel pump 4 and the high-pressure fuel pump 5 are actuated. Concurrently with this, the controller 30 opens the electromagnetic directional control valve 14 (step A4) and operates the fuel injector 1 in a specific operation mode. Described specifically, the injector gain of the low-pressure mode is selected (step A5) and the injector dead time of the low-pressure mode is selected (step A6).

When the engine speed has exceeded a predetermined value (for example, 430 rpm), the start-up mode is determined to have ended so that the routine advances from step A2 to step A7 to initiate timer counting. Determination in step A8 is then conducted. The operations of steps A4 to A6 are continued until the timer count reaches the predetermined time (namely, the predetermined time elapses).

In this state, fuel—which was delivered from the low-pressure fuel pump (feed pump) 4 and has been controlled to a predetermined low pressure value by the downstream low-pressure regulator (low-pressure regulator) 9—is fed to the fuel injector 1 and any surplus fuel is returned to the fuel tank as illustrated under (B) in FIG. 5. As is indicated by line C in FIG. 2, the low-pressure fuel pump 4 is promptly brought into a delivery pressure state of a predetermined pressure (several atm) subsequent to the start-up. The high-pressure fuel pump 5 is however unable to produce a sufficient delivery pressure as shown in FIG. 2, because the engine speed remains low immediately after the start-up of the engine.

Immediately after the start-up of the engine, the high-pressure fuel pump 5 therefore rather functions as a resistance to the flow of fuel through the fuel line 3, said flow having been produced by a delivery pressure by the low-pressure fuel pump 4. According to the present system, however, the fuel is fed to the side of the fuel injector 1 through the second bypass line 11 arranged in parallel with the high-pressure fuel pump 5, so that from the fuel injector 1, the fuel can be injected at a pressure of the level controlled by the low-pressure regulator 9 or so.

In general, the quantity of fuel to be required for combustion is small immediately after start-up of an engine. Accordingly, the pulse width of fuel injection can be set short and moreover, it is sufficient to set the pulse timing of fuel injection in such a way that fuel injection is performed only in the intake stroke like the conventional multipoint injection (MPI). Since the fuel injection is hence performed by selecting the low-pressure mode injector gain and the low-pressure mode injector dead time, the engine speed can be smoothly increased even at a fuel pressure of the level controlled by the low-pressure regulator 9 or so provided that the fuel pressure remains stable.

As the engine speed rises, the delivery rate of the high-pressure fuel pump 5 therefore increases as indicated by line A or B in FIG. 2. As a consequence, the delivery pressure of the high-pressure fuel pump 5 smoothly increases. When a predetermined time has elapsed, the routine advances from step A8 or step A9, whereby the controller 30 closes the electromagnetic directional control valve 14 to drive the fuel injector 1 in the ordinary operation mode (i.e., the high-pressure mode). Namely, the injector gain of the high-pressure mode is selected (step A10) and the injector dead time of the high-pressure mode is selected (step A11). Insofar as the engine does not stop, the operations of steps A9 to A11 are then continued.

As a result, as illustrated under (A) in FIG. 5, the fuel—which had been delivered from the low-pressure fuel pump (feed pump) 4, was pressurized to a high pressure by the high-pressure fuel pump 12 and has then been controlled to a predetermined high pressure by the high-pressure regulator 10—is fed to the fuel injector 1 and any surplus fuel is returned to the fuel tank.

As a consequence, the delivery pressure of the high-pressure fuel pump 5 progressively increases the fuel pressure on the downstream side of the high-pressure fuel pump 5 without being lost, whereby the fuel pressure can be raised to the pressure set by the high-pressure regulator 10. Further, the selection of the high-pressure mode injector gain and the high-pressure injector dead time permits appropriate fuel injection.

The delivery pressure of the high-pressure fuel injection pump 5 therefore increases to a sufficient level, whereby the injection of fuel from the fuel injector 1 can be performed at a fuel pressure as high as the pressure set by the high-pressure regulator 10. The engine speed can therefore be smoothly raised from immediately after the start-up of the engine. It is therefore possible to provide such a high fuel injection pressure as required, for example, to shorten the fuel injection period (namely, the pulse width of fuel injection) or to meet a supercharging pressure upon supercharging in a cylinder injection internal combustion engine.

The electromagnetic directional control valve 14 which opens or closes the first bypass line 13 is closed after subsequent to start-up of the engine, a predetermined time (a relatively short time) has elapsed and the discharge of vapor has been fully conducted. After the closure, it therefore becomes possible to increase the fuel pressure to a pressure controlled by the high-pressure regulator 10, thereby making it possible to provide a sufficient fuel injection pressure, for example, during high-speed driving.

In the third embodiment, the specific operation state is defined to continue from the initiation of a starting operation of the engine until the predetermined time elapses after departure from the start-up mode, and in this specific operation state, the electromagnetic directional control valve 14 is opened and the fuel injector 1 is operated in the specific operation mode (the low-pressure mode). After this predetermined time has elapsed, the ordinary operation state is defined to exist. In this ordinary operation state, the electromagnetic directional control valve 14 is closed and at the same time, the fuel injector 1 is operated in the ordinary operation mode (the high-pressure mode).

These operation modes have been set based on the fact that when the predetermined time has elapsed after the time point of departure from the start-up mode, the engine speed Ne generally increases, resulting in an increase in the delivery pressure of the high-pressure fuel pump 5 and hence in a high fuel pressure. These operation modes are effective in simplifying the control.

In the third embodiment described above, the fuel pressure is changed to the "low pressure" or the "high pressure" depending on the engine speed and the time elapsed since start-up of the engine. It is however possible to arrange the fuel pressure sensor 18 immediately downstream the fuel injector 1 as indicated by dashed lines in FIG. 1 and to change the fuel pressure in accordance with an output of the fuel pressure sensor 18. In this modification, the fuel pressure sensor 18 is arranged immediately downstream the fuel injector 1 to detect a surplus fuel pressure of the fuel injector 1, and outputs a detection signal to the controller 30.

Instead of the time from start-up of the engine, the above-described specific operation state in this modification is defined on the basis of detection information from the fuel pressure sensor 18 to continue until subsequent to start-up of the engine, the fuel pressure reaches a predetermined value which is greater than the pressure set by the low-pressure regulator 9 and is close to the pressure set by the high-pressure regulator 10. Accordingly, the controller 30 opens the electromagnetic directional control valve 14 at the time of start-up of the engine and uses the low-pressure mode injector gain and injector dead time of the fuel injector 1, and when the fuel pressure has reached a predetermined value, closes the electromagnetic directional control valve 14 and uses the high-pressure mode injector gain and injector dead time of the fuel injector 1.

Further, considering that the fuel feeding system is out of order when the fuel pressure detected by the fuel pressure sensor 18 does not reach a preset pressure despite the engine speed is sufficiently high, an alarm may be produced.

Since the fuel is recirculated through the first bypass line 13 upon start-up of the engine in each of the first to third embodiments described above, the following advantages can be brought about.

In an automotive internal combustion engine, for example, vapor (bubbles) tends to occur in the fuel line 3 due to a temperature increase in an engine compartment (bay) as a result of inactivation of an engine cooling system after the engine is stopped and/or due to leakage of fuel at the pressure regulators 9,10 and the fuel injector 1. When the driver subsequently attempts to start the engine, feeding of fuel is started with the vapor contained in the fuel line 3. In particular, vapor present around the fuel injector 1 leads to a delay or scattering in the rise of the pressure of the fuel to be injected or causes injection without fuel from the fuel injector 1, so that the control of the fuel injection is rendered difficult.

Vapor, which is present around the fuel injector 1 as described above, would not cause a problem provided that when fuel begins to flow through the flow line 3 by actuation of the fuel feeding system, the vapor is caused to flow away together with the fuel flowing through the return line 3B of the fuel line 3. The high-pressure regulator 10 arranged in the fuel line 3B however close to block the flow of the fuel unless the fuel pressure is high. Accordingly, the high-pressure regulator 10 also prevents discharge of the vapor. According to the fuel feeding system of each of the first to third embodiments of this invention, however, the first bypass line 13 is arranged in parallel with the high-pressure regulator 10. The electromagnetic directional control valve 14 which opens or closes the first bypass line 13 is kept open for the predetermined time after start-up of the engine, so that through the first bypass line 13, the fuel is allowed to flow to the downstream side of the return line 3B while bypassing the high-pressure regulator 10.

Together with the flow of the fuel, the vapor which is present in the fuel line 3 around the fuel injector 1 is caused to flow out of the fuel line 3. Even if the first bypass line 13 is open as described above, the fixed restrictor 15 or the low-pressure regulator 17 as the fuel pressure holding means holds the pressure of the fuel, which is present around the fuel injector 1, around at least a level close to the pressure set by the low-pressure regulator 9. Even while discharging the vapor, it is therefore still possible to maintain the pressure of the fuel, which is to be injected from the fuel injector 1, at a sufficient level at the time of start-up of the engine.

It is therefore possible to provide a sufficient fuel injection pressure even immediately after start-up of the engine while avoiding a problem, such as a delay or scattering in the rise of the pressure of the fuel or injection without fuel, which would otherwise occur due to the inclusion of vapor. This makes it possible to smoothly increase the engine speed while maintaining good combustion in the engine from immediately after start-up of the engine, and hence to significantly improve the utility of a cylinder injection engine, for example.

To provide a measure against the problem of vapor at the time of start-up of the engine, it is also possible, in view of the foregoing, to control the electromagnetic directional control valve 14, which opens or closes the first bypass line 13, in such a way that the electromagnetic directional control valve 14 is closed after a predetermined time (a relatively short time) has elapsed since start-up of the engine and the discharge of vapor has been conducted sufficiently. Namely, it is only necessary to perform the switching of the fuel pressure to the "low pressure" or the "high pressure" in correspondence to one or more of plural purposes such as a measure for improper operation of the high-pressure fuel pump and a measure fro the elimination of vapor at the time of start-up of the engine.

In the first to third embodiments described above, an upstream-side branching point of the branch line 9A in which the low-pressure regulator 9 is inserted is positioned downstream an upstream-side branching point of the second bypass line 11. As is illustrated in FIG. 9 which is directed to the fourth embodiment to be described subsequently herein, the upstream-side branching point of the branch line 9A can however be positioned upstream the upstream-side branching point of the second bypass line 11.

Describing next the fourth embodiment, the fuel feeding system of this embodiment for an internal combustion engine is intended to prevent occurrence of vapor (bubbles) in the fuel line 3 due to a temperature increase in an engine compartment (bay) after the engine is stopped and/or due to leakage of fuel at the high-pressure fuel pump 5 or the fuel injector 1.

Figure 9:
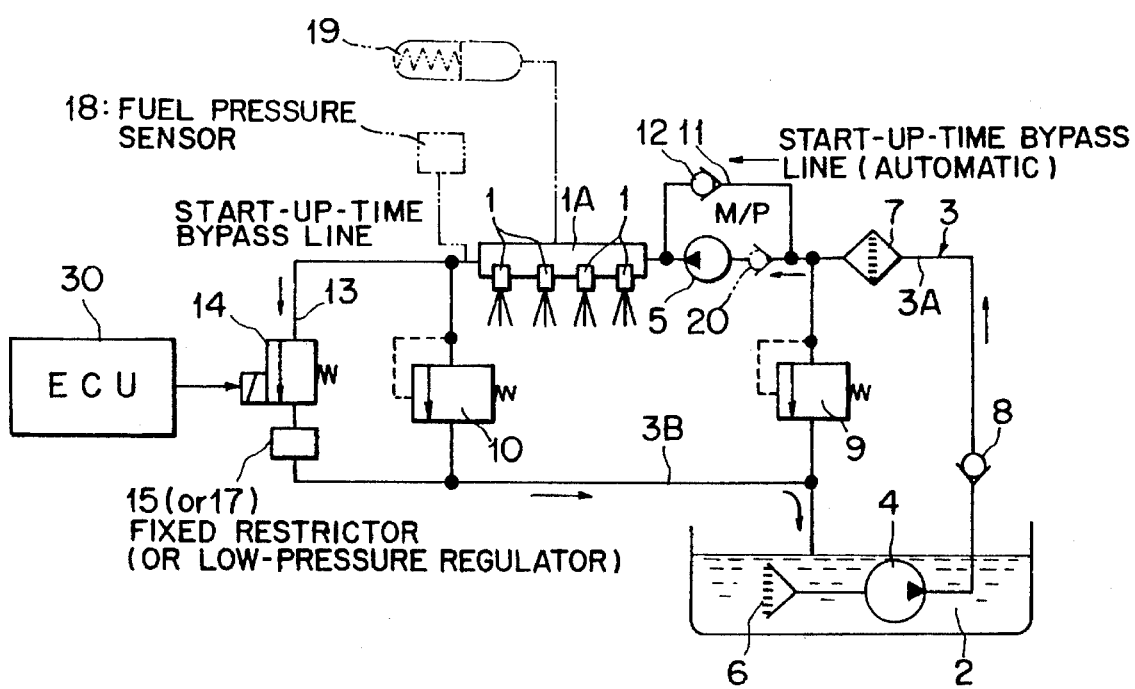
FIG. 9 is a simplified block diagram of a fuel feeding system according to a fourth embodiment of the present invention for the internal combustion engine.

In the fuel feeding system according to the fourth embodiment, an accumulator 19 is arranged in the fuel line 3 at the position of the fuel injector 1 and the high-pressure fuel pump 5 is provided with a check valve 20, as illustrated in FIG. 9. This check valve 20 is to prevent reverse flow of the fuel on the downstream side of the high-pressure fuel pump. As is shown in FIG. 9, the check valve 20 can be disposed in parallel with the high-pressure fuel pump 5. As an alternative, the check valve 20 can be arranged at the downstream outlet of the high-pressure fuel pump 5 in series with the high-pressure fuel pump 5.

These accumulator 19 and check valve 20, the below-described check valve 12 and the above-described high-pressure regulator 10 are to maintain the fuel pressure at a certain specific level, that is, to allow the fuel to maintain a saturated vapor pressure corresponding to its temperature after the engine is stopped. They are to close the fuel line 3 in the vicinity of the fuel injector 1 so that even if the fuel is leaked when the engine is cool, vapor (bubbles) does not penetrate the fuel line 3 at the position of the fuel injector 1 from the outside.

To cause the fuel, which is flowing through the feed line 3A of the fuel line 3, to bypass the high-pressure fuel pump 5 so that the fuel can be fed to the fuel injector 1, a bypass line 11 is arranged connecting the feed line 3A between an upstream-side portion and a downstream-side portion thereof, both relative to the high-pressure fuel pump 5. Arranged in the bypass line 11 is the check valve 12 which allows the fuel to flow through the feed line 3A only from an upstream side thereof toward a downstream side thereof. When the high-pressure fuel pump 5 does not operate fully and the fuel pressure is lower on the downstream side than the upstream side of the high-pressure fuel pump 5, the check valve 12 opens the bypass line 11. When the high-pressure fuel pump 5 fully operates and the fuel pressure becomes higher on the downstream side than the upstream side of the high-pressure fuel pump 5, the check valve 12 closes the bypass line 11.

FIG. 9 shows the bypass line 13, the electromagnetic directional control valve 14 and the fuel pressure holding means 15. They can however be omitted.

Since the fuel feeding system for the internal combustion engine, as the fourth embodiment of the present invention, is constructed as described above, turning of the ignition key switch 16 to the starter-on position starts (in other words, cranks) the engine and at the same time, operates the low-pressure fuel pump 4 and the high-pressure fuel pump 5. As a result, the fuel pressure is set as in the above-described first to third embodiments.

In an automotive internal combustion engine, for example, vapor (bubbles) tends to occur in the fuel line 3 due to a temperature increase in an engine compartment (bay) as a result of inactivation of an engine cooling system after the engine is stopped and/or due to leakage of fuel at the high-pressure fuel pump 5 or the fuel injector 1. According to the fuel feeding system of the fourth embodiment, the fuel line 3 is closed near the fuel injector 1 by the check valves 8,20 and the high-pressure regulator 10 and the fuel sufficiently accumulated in the accumulator 19 replenishes any leaked portion of the fuel. The fuel pressure is therefore prevented from lowering, so that the fuel pressure is maintained at a saturated vapor pressure corresponding to the fuel temperature. Accordingly, vapor (bubbles) are prevented from entering the fuel line 3 at the position of the fuel injector 1 from the outside.

At this time, the fuel which is present around the fuel injector 1 is prevented from leakage by the check valves 8,20 on the upstream side and by the high-pressure regulator 10 on the downstream side. While the engine is stopped, the electromagnetic directional control valve 14 is of course closed and leakage is also prevented there.

As a result, any inconvenience which would generally occur due to the presence of vapor around the fuel injector 1, namely, inconvenience such as a delay or scattering in the rise of the pressure of the injected fuel or injection without fuel by the fuel injector 1 can be eliminated, so that from immediately after start-up of the engine, the engine speed can be smoothly increased while maintaining good combustion in the engine. The utility of a cylinder injection engine, for example, can therefore be improved considerably.

Figure 10:
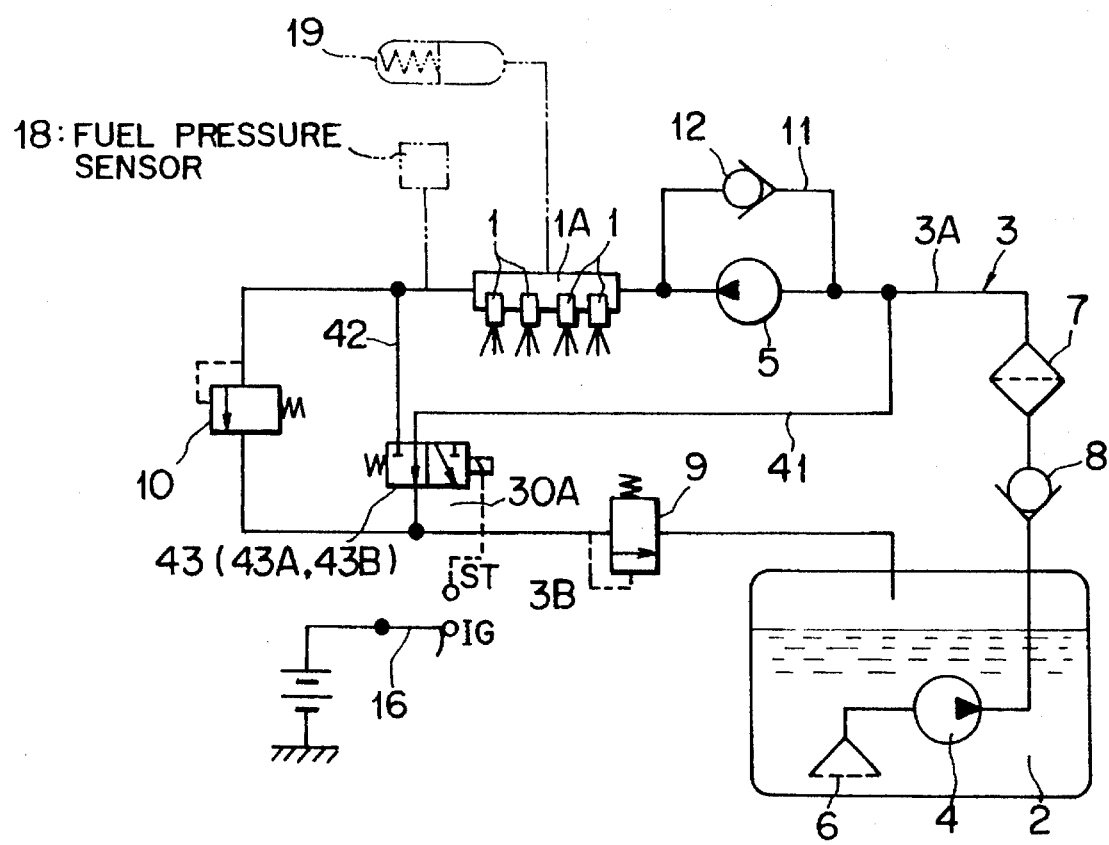
FIG. 10 is a simplified block diagram of a fuel feeding system according to a fifth embodiment of the preset invention for the internal combustion engine.

A description will next be made of the fifth embodiment. The fuel feeding system according to this embodiment for an internal combustion engine is also installed in a 4-cycle gasoline engine as the internal combustion engine, especially in a cylinder injection gasoline engine in which fuel is injected directly into each cylinder. As is depicted in FIG. 10, the low-pressure fuel pump 4 and the high-pressure fuel pump 5 are arranged in the fuel line 3 which connects the fuel injector 1 and the fuel tank 2 with each other. Incidentally, the fuel line 3 is constructed of the feed line 3A and the return line 3B like the above-described first to fourth embodiments.

Further, the relationship between certain essential elements of the fuel feeding system according to the fifth embodiment and the engine is similar to that shown in FIG. 13 so that its description is omitted herein.

Although the low-pressure fuel pump 4 and the high-pressure fuel pump 5 are also constructed as in the first to fourth embodiments described above, these low-pressure fuel pump 4 and high-pressure fuel pump 5 have to provide a discharge flow rate equal to or greater than a desired fuel injection quantity so that the desired fuel injection quantity can be achieved always. This can of course be achieved provided that high-output fuel pumps are used as these fuel pumps 4,5 to always provide a sufficient delivery flow rate. Fuel pumps 4,5 of unnecessarily high outputs are however wasteful in every aspect. It is desired to employ as the fuel pumps 4,5 those having necessary and sufficient but minimum outputs.

The capacities of the fuel pumps 4,5 are set from such a viewpoint. As the low-pressure fuel pump 4 which is not required to provide varied delivery rates, a pump can be used provided that it can meet the maximum fuel injection quantity. The low-pressure fuel pump 4 is therefore set at a pump delivery flow rate slightly greater than the maximum fuel injection quantity (namely, the maximum fuel injection rate+α, α>0). In the case of the high-pressure fuel pump 5 whose delivery rate varies depending on the engine speed, the delivery rate significantly drops when the engine speed is low. Its capacity is therefore set to assure the fuel injection quantity at the low engine speed, in other words, to make the delivery rate of the high-pressure fuel pump substantially equal to the fuel injection quantity at the low engine speed.

Further, between the feed line 3A and the return line 3B of the fuel line 3, namely, between a portion of the feed line 3A, said portion being on a downstream side of the fuel filter 7 but on an upstream side of the high-pressure fuel pump 5, and a most downstream portion of the return line 3B, the low-pressure regulator 9 is arranged to control the delivery pressure from the low-pressure fuel pump 4 to a preset pressure (for example, 3 atm).

In the illustrated fuel feeding system, a communication line 41 is inserted between a portion of the feed line 3A, said portion being on the downstream side of the fuel filter 7 but on the upstream side of the high-pressure fuel pump 5, and a portion between both the regulators 9 and 10, namely, a downstream portion of the return line 3B, said downstream portion being on an upstream side of the low-pressure regulator 9. The low-pressure regulator 9 is disposed in a most downstream portion of the return line 3B and is communicated with the feed line 3A via the communication line 41. The communication line 41 will be described in detail subsequently herein.

Immediately downstream the fuel injector 1, namely, in a most upstream portion of the return line 3B of the fuel line 3, the high-pressure regulator 10 is disposed to control the delivery pressure from the high-pressure fuel pump 5 to a preset pressure (for example, 50 atm).

Incidentally, the low-pressure regulator 9 and the high-pressure regulator 10 are constructed as in the first to third and fifth embodiments described above.

The above-described communication line 41 is arranged so that a portion of the return line 3B, said portion being located between the high-pressure regulator 10 and the low-pressure regulator 9, can be communicated to a portion of the feed line 3A, said portion being on the inlet side of the high-pressure fuel pump 5. This communication line 41 allows to feed the fuel on the downstream side of the high-pressure regulator 10 to the inlet side of the high-pressure fuel pump 5, so that the fuel pressure at the inlet of the high-pressure fuel pump 5 can be maintained at the fuel pressure on the downstream side of the high-pressure regulator 10.

Further, the fuel feeding system according to the fifth embodiment is provided with the high-pressure fuel pump bypass line (hereinafter called "the second bypass line") 11, which connects the feed line 3A between an upstream side portion and downstream side portion of the high-pressure fuel pump 5 so that the fuel passing through the feed line 3A of the fuel line 3 can be fed to the fuel injector 1 while bypassing the high-pressure fuel pump 5. Arranged in the second bypass line 11 is the check valve 12 which allows the fuel to pass only from the upstream side toward the downstream side of the feed line 3A. This check valve 12 is similar to those in the first to fourth embodiments described above, and opens the second bypass line 11 when the high-pressure fuel pump 5 does not operate sufficiently and the fuel pressure is lower on the downstream side than the upstream side of the high-pressure fuel pump 5 but closes the second bypass line 11 when the high-pressure fuel pump 5 operates sufficiently and the fuel pressure becomes higher on the downstream side than the upstream side of the high-pressure fuel pump 5.

In addition, the fuel feeding system according to the fifth embodiment is also provided with a bypass line (hereinafter called "the first bypass line") 42 which connects the return line 3B between an upstream side and a downstream side of the high-pressure regulator 10 so that the fuel present at the fuel injector 1 can be discharged toward the side of the fuel tank 2 while bypassing the high-pressure regulator 10. This first bypass line 42 is intended to discharge vapor (bubbles), which is contained in the fuel line 3 in the vicinity of the fuel injector 1, and also to set the fuel pressure at the "low pressure" in an initial stage of start-up of the engine.

One end of the first bypass line 42, at which end the first bypass line 42 is connected to the downstream portion of the high-pressure regulator 10, is positioned near one end of the above-described communication line 41, and an electromagnetic three-way valve 43 is interposed as a directional control valve between the one end of the communication line 41, one end of the first bypass line and the return line 3B.

This electromagnetic three-way valve 43 serves as both a switching valve 43A for the first bypass line 42 and the open/close valve (communication line open/close valve) 43B of the communication path 41. It is provided so that it closes the communication line 41 when the first bypass line 42 is open and the communication line 41 is opened when the first bypass line 42 is closed.

Namely, the electromagnetic three-way valve 43 communicates only one of the communication line 41 and the first bypass line 42 to the return line 3B. In the illustrated embodiment, the electromagnetic three-way valve 43 opens the first bypass line 42 when energized and actuated but opens the communication line 41 when deenergized and rendered out of actuation. When the ignition key switch 16 is operated to the starter position, the electromagnetic three-way valve 43 is actuated in association with the operation of the ignition key switch 16 so that the first bypass line 42 is opened while the communication line 41 is closed. Responsive to completion of discharge of vapor contained near the fuel injector 1, conversion of the high-pressure fuel pump 5 into a normal operation state, or the like, the first bypass line 42 is closed and the communication line 41 is opened.

Incidentally, a switching valve 43A of the first bypass line 42 and a switching valve (communication line on/off valve) 43B of the communication line 41 can be constructed as discrete members. In this case, the respective switching valves 43A,43B are interlocked so that the communication line 41 is closed when the the first bypass line 42 is opened but the communication line 41 is opened when the first bypass line 42 is closed.

To close the communication line and to open the first bypass line 42 correspond to opening of the electromagnetic directional control valve (bypass valve) 14 in the first to third embodiments. Thus, control of the electromagnetic three-way valve 43 and the injector gain is conducted via ECU (not show) in accordance with the flow chart of FIG. 8. In FIGS. 4 and 8, closure of the bypass valve (i.e., closure of the electromagnetic directional control valve 14) corresponds to opening of the communication line 41 and closure of the first bypass line 42. Where discharge of vapor is intended to be a primary object, continued opening of the first bypass line 42 for a certain time substantially completes discharge of vapor which is present around the fuel injector 1. This time until the completion of discharge of the vapor can be estimated, for example, based on an experiment, so that based on the time of the completion of discharge of the vapor, said time being predictable in advance, the vapor discharging operation can be finished, in other words, the supply of power to the electromagnetic three-way valve 43 can be stopped to open the communication line 41.

. For this purpose, switching valve control means 30A is arranged to control opening or closing of the electromagnetic three-way valve 43. This switching valve control means 30A can be constructed by such a system that the electromagnetic three-way switch 43 itself is provided with a timer which starts responsive to actuation of the electromagnetic three-way valve 43 and the electromagnetic three-way valve 43 is rendered out of actuation when the count of the timer has elapsed a preset time.

Where it is designed, for example, to electronically control the supply of electric power to the electromagnetic three-way valve 43 by a controller, the controller can be used as the switching valve control means 30A. Namely, it is possible to construct in such a way that based on a starter-on signal from the ignition key switch 16, electric power is supplied through the controller to the electromagnetic three-way valve 43 and at the same time, the timer provided in association with the electromagnetic three-way valve 43 is started and when a signal indicating passage of the preset time is received from the timer, the supply of electric power to the electromagnetic three-way valve 43 is stopped.

The time of the above-described discharging operation of the vapor, in other words, the time during which the electromagnetic three-way valve 43 is kept open is estimated to be generally sufficient when the electromagnetic three-way vale 43 remains open for a short time (within several seconds or so) after start-up of the engine.

Since the fuel feeding system according to the fifth embodiment of this invention for the internal combustion engine is constructed as described above, turning of the ignition key switch 16 to the starter-on position starts (in other words, cranks) the engine and at the same time, operates the low-pressure fuel pump 4 and the high-pressure fuel pump 5. The electromagnetic three-way valve 43, on the other hand, receives electric power concurrently with the start-up of the engine, whereby the first bypass line 42 is opened.

The low-pressure fuel pump 4 is brought into an output pressure state of a predetermined level (several atm) promptly subsequent to start-up of the engine as shown by line C in FIG. 2. Since the engine speed does not increase immediately after the start-up of the engine, the high-pressure fuel pump 5 however does not produce a sufficient delivery pressure as indicated by line A or B in FIG. 2.

Immediately after the start-up of the engine, the high-pressure fuel pump 5 therefore rather functions as a resistance to the flow of fuel through the fuel line 3, said flow having been produced by a delivery pressure by the low-pressure fuel pump 4. According to the present system, however, the fuel is fed to the side of the fuel injector 1 through the second bypass line 11 arranged in parallel with the high-pressure fuel pump 5, so that from the fuel injector 1, the fuel can be injected at a pressure of the level controlled by the low-pressure regulator 9 or so.

Although the second bypass line 11 is provided with the check valve 12, this check valve 12 opens the second bypass line 11 when the fuel pressure is lower on the downstream side than the upstream side of the high-pressure fuel pump 5. The fuel is therefore fed to the side of the fuel injector 1 at a pressure of the level controlled by the low-pressure regulator 9 or so unless the high-pressure fuel pump 5 produces a sufficient delivery pressure.

In general, the quantity of fuel to be required for combustion is small immediately after start-up of an engine. Accordingly, the pulse width of fuel injection can be set short and moreover, it is sufficient to set the pulse timing of fuel injection in such a way that fuel injection is performed only in the intake stroke like the conventional multipoint injection (MPI). The engine speed can be smoothly increased even at a fuel pressure of the level controlled by the low-pressure regulator 9 or so provided that the fuel pressure remains stable. As the engine speed rises, the delivery rate of the high-pressure fuel pump 5 therefore increases as indicated by line A or B in FIG. 2. As a consequence, the delivery pressure of the high-pressure fuel pump 5 smoothly increases.

When the high-pressure fuel pump 5 begins to operate at a certain level as described above, the fuel pressure becomes higher on the downstream side than the upstream side of the high-pressure fuel pump 5, so that the check valve 12 closes the second bypass line 11, the delivery pressure of the high-pressure fuel pump 5 progressively increases the fuel pressure on the downstream side of the high-pressure fuel pump 5 without being lost and the fuel pressure is hence raised beyond the pressure controlled by the high-pressure regulator 10.

As a result, the delivery pressure of the high-pressure fuel pump 5 increases to a sufficient level so that fuel injection can be performed from the fuel injector 1 at a fuel pressure as high as the level controlled by the high-pressure control valve 10 or so.

In such a state, the first bypass line 42 is closed while the communication line 41 is opened. Since the fuel pressure is set at a high pressure. By progressively and smoothly increasing the engine speed from immediately after start-up of the engine, it is hence possible to obtain a high fuel injection pressure which is required to shorten the fuel injection period (namely, the pulse width of fuel injection) or to provide a supercharging pressure upon supercharging, for example, in an internal combustion engine of the cylinder injection type.

In an automotive internal combustion engine, for example, vapor (bubbles) tends to occur in the fuel line 3 due to a temperature increase in an engine compartment (bay) as a result of inactivation of an engine cooling system after the engine is stopped and/or due to leakage of fuel at the pressure regulators 9,10 and the fuel injector 1. When the driver subsequently attempts to start the engine, feeding of fuel is started with the vapor contained in the fuel line 3. In particular, vapor present around the fuel injector 1 leads to a delay or scattering in the rise of the pressure of the fuel to be injected or causes injection without fuel from the fuel injector 1, so that the control of the fuel injection is rendered difficult.

Vapor, which is present around the fuel injector 1 as described above, would not cause a problem provided that when fuel begins to flow through the flow line 3 by actuation of the fuel feeding system, the vapor is caused to flow away together with the fuel flowing through the return line 3B of the fuel line 3. The high-pressure regulator 10 arranged in the fuel line 3B however closes to block the flow of the fuel unless the fuel pressure is high. Accordingly, the high-pressure regulator 10 also prevents discharge of the vapor. According to the fuel feeding system of the fifth embodiment of this invention, however, the first bypass line 42 is arranged in parallel with the high-pressure regulator 10. The electromagnetic three-way valve 43 which opens or closes the first bypass line 42 keeps the first bypass line 42 open for the predetermined time after start-up of the engine, so that through the first bypass line 42, the fuel is allowed to flow to the downstream side of the return line 3B while bypassing the high-pressure regulator 10.

Together with the flow of the fuel, the vapor which is present in the fuel line 3 around the fuel injector 1 is caused to flow out of the fuel line 3. Even if the first bypass line 42 is open as described above, the low-pressure regulator 9 arranged in a downstream part of the first bypass line 42 holds the pressure of the fuel at the preset pressure. Even while discharging the vapor, it is therefore still possible to maintain the pressure of the fuel, which is to be injected from the fuel injector 1, at a sufficient level at the time of start-up of the engine.

It is therefore possible to provide a sufficient fuel injection pressure even immediately after start-up of the engine while avoiding a problem, such as a delay or scattering in the rise of the pressure of the fuel or injection without fuel, which would otherwise occur due to the inclusion of vapor. This makes it possible to smoothly increase the engine speed while maintaining good combustion in the engine from immediately after start-up of the engine, and hence to significantly improve the utility of a cylinder injection engine, for example.

The electromagnetic three-way valve 43 closes the first bypass line 42, when the predetermined time (the relatively short time) has elapsed after start-up of the engine so that the discharge of vapor has been fully conducted and the high-pressure pump 5 has reached in a properly operated state. It is then possible to increase the fuel pressure to the pressure controlled by the high-pressure regulator 10.

Since the electromagnetic three-way valve 43 closes the first bypass line 42 and opens the communication line 41, the reduction of the fuel pressure at the inlet of the high-pressure fuel pump 5 is suppressed even when the delivery flow rate of the high-pressure fuel pump becomes greater than that of the low-pressure fuel pump, for example, when the engine speed is high. It is hence possible to avoid occurrence of cavitation at the inlet of the high-pressure fuel pump 5.

Since the delivery flow rate of the low-pressure fuel pump 4 remains constant although the delivery flow rate of the high-pressure fuel pump 5 increases with the engine speed, the delivery flow rate of the high-pressure fuel pump 5 may exceeds that of the low-pressure fuel pump 4 at high engine speeds.

Although such a situation would inherently result in a drop in the pressure of fuel at the inlet of the high-pressure fuel pump 5, the pressure of fuel at the inlet of the high-pressure fuel pump 5 does not drop in the fuel feeding system according to the fifth embodiment because the fuel present downstream the high-pressure regulator 10 flows to the inlet of the high-pressure fuel pump 5 through the communication line 41. In particular, when the delivery flow rate of the high-pressure fuel pump 5 increases as described above, the fuel pressure exceeds the preset pressure on the downstream side of the high-pressure fuel pump 5. The fuel therefore overflows to the downstream side at the high-pressure regulator 10 so that the fuel pressure becomes sufficiently high at the position of the communication line 41. As the low-pressure regulator 9 is arranged on the downstream side of the communication line 41, the fuel pressure in the communication line 41 is controlled at the pressure set by the low-pressure regulator 9.

It is therefore possible to surely avoid occurrence of cavitation at the inlet of the high-pressure fuel pump 5. The fuel pressure at the inlet of the high-pressure fuel pump 5 therefore always remain stable, thereby achieving extremely good feeding of fuel and also protecting the pumps, the fuel line, the injector and the like form damages without failure.

As indicated by two-dot chain lines in FIG. 10, it can also be contemplated of arranging a fuel pressure sensor 18 immediately downstream the fuel injector 1 in the fifth embodiment to detect any surplus fuel pressure at the fuel injector 1, detecting a fault of the fuel feeding system on the basis of information detected by the fuel pressure sensor 18' and then warning the fault to the driver or feeding the fault back to the control of the fuel feeding. If the fuel pressure detected by the fuel pressure sensor 18 becomes lower than a preset pressure range in the above case, it can be estimated, for example, that the sealing portion of the fuel injector 1 or the pump stem, the piping or the like has been damaged and the fuel is leaking. If the fuel pressure detected by the fuel pressure sensor 18 be comes higher than the preset pressure range, on the other hand, one of the valves on the return line 3B, such as the high-pressure regulator 10 or the electromagnetic three-way valve 43, can be estimated to have locked.

Like the second embodiment, the accumulator 19 and the check valve 20 can be arranged.

Figure 11:
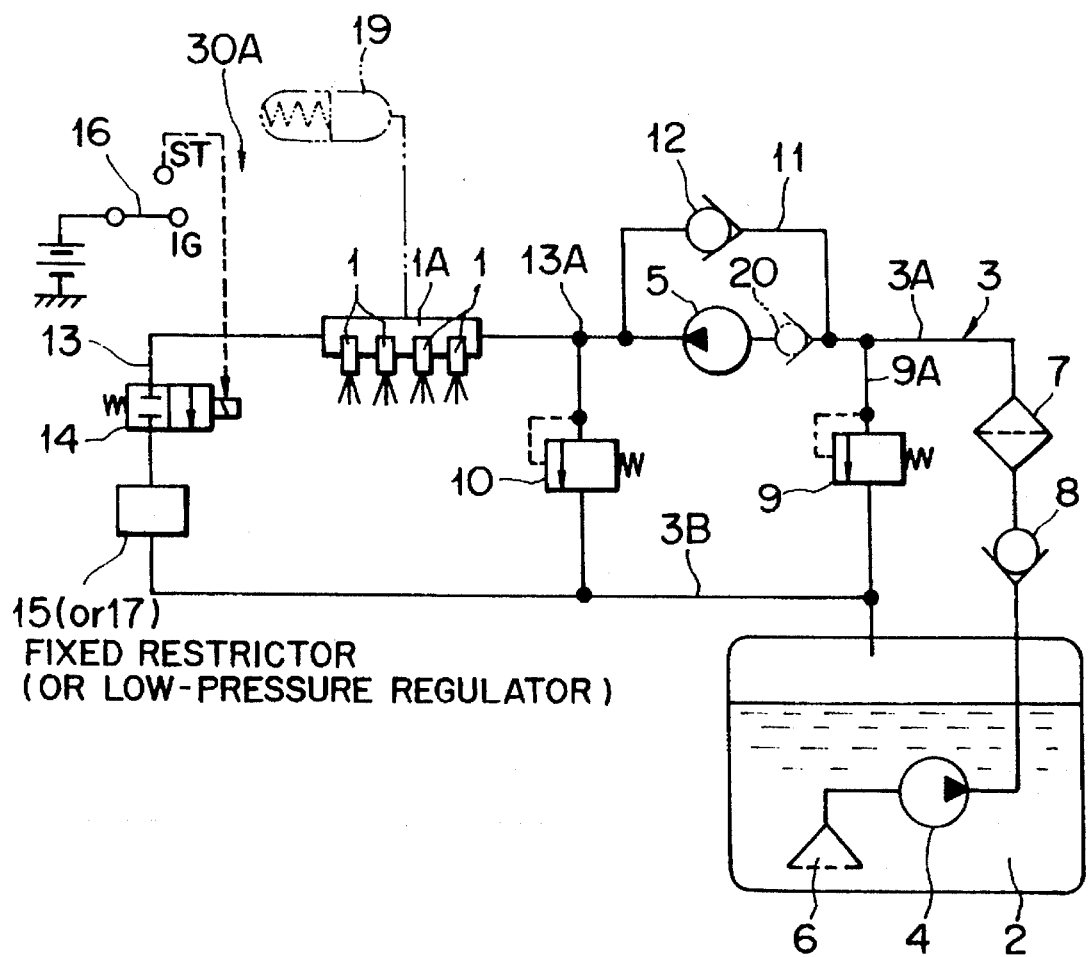
FIG. 11 is a simplified block diagram of a fuel feeding system according to a sixth embodiment of the present invention for the internal combustion engine.
Figure 12:
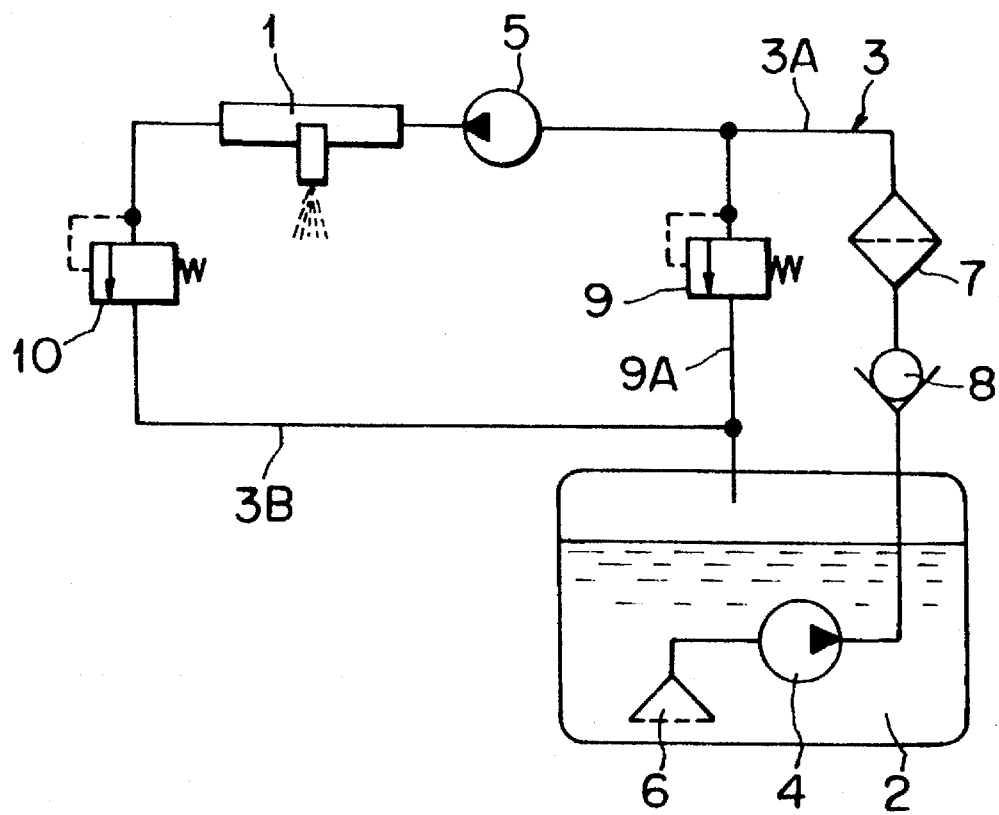
FIG. 12 is a schematic diagram of a conventional fuel feeding system for an internal combustion engine.

A description will next be made of the sixth embodiment. The fuel feeding system of this embodiment for an internal combustion is different from each of the above-described embodiments in the arrangement of the fuel injector 1 as shown in FIG. 11. In this embodiment, the fuel injector 1 is arranged in the bypass line 13 on a downstream side of a branching portion 13A.

From an upstream side of the fuel line 3, the fuel filter 6, the low-pressure fuel pump (first low-pressure control means) 4, the check valve 8, the fuel filter 7, the high-pressure fuel pump 5 and the high-pressure regulator (high-pressure control means) 10 are arranged successively. The first bypass line 13 is arranged branching from the branching portion 13A at a most downstream part of the feed line 3A between the high-pressure fuel pump 5 and the high-pressure regulator 10. In this first bypass line 13, the fuel injector 1, the electromagnetic directional control valve (switching valve) 14, and the fixed restrictor 15 or the low-pressure regulator 17 as the first low-pressure control means are inserted in parallel with the high-pressure regulator 10.

Further, the low-pressure regulator 9 is disposed in the branch line 9A which extends between the feed line 3A and the return line 3B. Circumventing the high-pressure fuel pump 5, the second bypass line 11 equipped with the check valve 12 is also arranged.

Similarly to the electromagnetic three-way valve 43 in the fifth embodiment, the electromagnetic directional control valve 14 opens the first bypass line 13 when energized and actuated but closes it when deenergized and rendered out of actuation. When the ignition key switch 16 is operated to the starter position, the electromagnetic directional control valve 14 is actuated in association with the operation of the ignition key switch 16, whereby the first bypass line 13 is opened. As a consequence, vapor present in the vicinity of the fuel injector 1 is caused to flow out.

In this embodiment, the supply of electric power to the electromagnetic directional control valve 14 is stopped when based on a time required for the completion of a discharge operation of vapor, said time being predictable in advance, the vapor discharge operation is determined to have been completed or the high-pressure fuel pump 5 has been brought into a proper operation state, whereby closure of the first bypass line 13 is performed.

For this purpose, the switching valve control means 30A is arranged to control opening or closure of the electromagnetic directional control valve 14. This switching valve control means 30A can be constructed by such a system that the electromagnetic directional control valve 14 itself is provided with a timer which starts responsive to actuation of the electromagnetic directional control valve 14 and the electromagnetic directional control valve 14 is rendered out of actuation when the count of the timer has elapsed a preset time.

Where it is designed, for example, to electronically control the supply of electric power to the electromagnetic directional control valve 14 by a controller, the controller can be used as the switching valve control means 30A. Namely, it is possible to construct in such a way that based on a starter-on signal from the ignition key switch 16, electric power is supplied through the controller to the electromagnetic directional control valve 14 and at the same time, the timer provided in association with the electromagnetic directional control valve 14 is started and when a signal indicating passage of the preset time is received from the timer, the supply of electric power to the electromagnetic directional control valve 14 is stopped. It is also possible to perform the control in accordance with the flow chart of FIG. 4 or FIG. 8.

The fuel pressure sensor 18 is arranged immediately downstream the fuel injector 1. As has been described in connection with the second embodiment, it can be contemplated that upon detection of a fault in the fuel feeding system on the basis of detection information from the fuel pressure sensor, the fault can be warned to the driver by the alarm lamp 40, an alarm buzzer (not shown) or the like or can be fed back to the control of fuel feeding.

In each of the above embodiments, fuel is fed under pressure to the fuel injector valve by the low-pressure fuel pump while bypassing the high-pressure fuel pump. This invention is however not limited to such embodiments. For example, this invention can also be applied to a fuel feeding system for an internal combustion engine, in which the high-pressure fuel pump is not bypassed even at the time of start up as disclosed, for example, in Japanese Patent Application Laid-Open (Kokai) No. SHO 62-237057.

It is also contemplated to create a fuel feeding system by partially combining the above-described embodiments.

What is claimed is:

1. A fuel feeding system for an internal combustion engine, comprising:
    a fuel line arranged between a fuel injector, disposed in the internal combustion engine, and a fuel tank and formed as a recirculation circuit extending from said fuel tank to said fuel injector and then returning from said fuel injector to said fuel tank;
    a low-pressure fuel pump arranged in an upstream part of said fuel line;
    a high-pressure fuel pump arranged in said fuel line between said low-pressure fuel pump and said fuel injector;
    high-pressure control means arranged in a fuel line portion on a downstream side of said high-pressure fuel pump to control the pressure of fuel delivered from said high-pressure fuel pump;
    a first bypass line connecting another fuel line portion on an upstream side of said high-pressure control means and said fuel line portion on the downstream side of said high-pressure control means to each other;
    a switching valve arranged in said first bypass line to open or close said first bypass line;
    low-pressure control means for controlling the pressure of fuel in said upstream-side fuel line portion of said first bypass line at a pressure lower than a control pressure set by said high-pressure control means while said switching valve is open; and
    control means for performing open/close control of said switching valve so that said switching valve is closed in an ordinary operation state of said internal combustion engine but is opened in a specific operation state of said internal combustion engine, said specific operation state including at least an operation state at a start-up of said internal combustion engine.

2. A fuel feeding system according to claim 1, wherein said control means is provided with additional means for performing control of the state of feeding of fuel or burning air to said internal combustion engine in association with the open/close control of said switching valve.

3. A fuel feeding system according to claim 2, wherein said additional means controls drive of said fuel injector by setting a pulse width suited for high-pressure fuel injection in said ordinary operation state but a pulse width suited for low-pressure fuel injection in said specific operation state.

4. A fuel feeding system according to claim 3, wherein said specific operation state is a state in which the delivery pressure of said high-pressure fuel pump is not sufficient.

5. A fuel feeding system according to claim 3, wherein said fuel feeding system additionally comprises means for detecting the pressure of fuel in the vicinity of said fuel injector and said specific operation state is a state in which the pressure of fuel in the vicinity of said fuel injector detected by said fuel pressure detection means is low.

6. A fuel feeding system according to claim 5, wherein said fuel feeding system additionally comprises means for alarming a low fuel pressure in the vicinity of said fuel injector when the pressure of fuel in the vicinity of said fuel injector detected by said fuel pressure detection means is low.

7. A fuel feeding system according to claim 3, wherein said specific operation state is a state in which said high-pressure fuel pump or said high-pressure control means is out of order.

8. A fuel feeding system according to claim 3, wherein said high-pressure fuel pump is driven by said internal combustion engine.

9. A fuel feeding system according to claim 3, wherein said high-pressure fuel pump is driven by said internal combustion engine; said fuel feeding system additionally comprises means for detecting a speed of said internal combustion engine and means for detecting an operation mode of said internal combustion engine; and where an engine speed detected by said engine speed detection means subsequent to detection of the end of a start-up operation mode by said internal combustion operation mode detection means is lower than a first reference engine speed, said control means performs the open/close control of said switching valve so that said switching valve remain in an open state.

10. A fuel feeding system according to claim 3, wherein said high-pressure fuel pump is driven by said internal combustion engine; said fuel feeding system additionally comprises means for detecting a speed of said internal combustion engine; and when the state of an engine speed detected to have reached or exceeded the first reference engine speed by said engine speed detection means has continued for a predetermined time, said control means performs the open/close control of said switching valve to cancel the open state of said switching valve to bring the switching valve into a closed state.

11. A fuel feeding system according to claim 10, wherein when the engine speed is detected by said engine speed detection means 34 to have reached a second reference engine speed higher than the first reference engine speed, said control means 30 performs the open/close control of said switching valve to cancel the open state of said switching valve and then to bring the switching valve into a closed state even if the condition that the state, that the engine speed detected by said engine speed detection means reached said first reference engine speed, has not continued for said preset time.

12. A fuel feeding system according to claim 3, wherein said high-pressure fuel pump is driven by said internal combustion engine; and said fuel feeding system additionally comprises:

means for detecting a speed of said internal combustion engine; and control means for performing, upon detection of a rise of the engine speed to the reference engine speed by said engine speed detection means, the open/close control of said switching valve to cancel the open state of said switching valve and then to bring the switching valve into a closed state.

13. A fuel feeding system according to claim 1, wherein said low-pressure control means is a regulator arranged in said first bypass line.

14. A fuel feeding system according to claim 1, wherein said low-pressure control means comprises a regulator arranged between an inlet side of said high-pressure fuel pump and an outlet side of said low-pressure fuel pump and an orifice formed in said first bypass line.

15. A fuel feeding system according to claim 1, wherein said low-pressure control means is a low-pressure regulator arranged in a fuel line portion on a downstream side of said first bypass line.

16. A fuel feeding system according to claim 15, wherein said high-pressure control means is a high-pressure regulator; and said fuel feeding system additionally comprises a communication line, which connects a fuel line portion located between said fuel pumps and a fuel line portion located between said regulators, and a communication line open/close valve for closing said communication line when said switching valve is open but opening said communication line when said switching valve is closed.

17. A fuel feeding system according to claim 16, wherein said switching valve and said communication line open/close valve are constructed by said single switching valve.

18. A fuel feeding system according to claim 1, wherein said fuel feeding system additionally comprises:

a check valve arranged in said fuel line at a point near said high-pressure fuel pump to prevent fuel on a downstream side of said high-pressure fuel pump from flowing backward; and an accumulator arranged in the vicinity of said fuel injector on the downstream side of said high-pressure fuel pump so that the pressure of fuel can be held at a predetermined level.

19. A fuel feeding system according to claim 1, wherein said high-pressure control means is a high-pressure regulator arranged on a downstream side of said fuel injector.

20. A fuel feeding system according to claim 1, wherein said fuel feeding system further comprises:

a second bypass line arranged bypassing said high-pressure pump; and a check valve inserted in said second bypass line to prevent fuel from flowing from the downstream side of said high-pressure fuel pump to the upstream side of said high-pressure fuel pump.

21. A fuel feeding system comprising:

a fuel line formed as a recirculation circuit so that said fuel line communicates at one end thereof to a fuel tank and returns at an opposite end thereof to said fuel tank;

a low-pressure fuel pump arranged in an upstream part of said fuel line;

a high-pressure fuel pump arranged on a downstream side of said low-pressure fuel pump;

high-pressure control means arranged on a downstream side of said high-pressure fuel pump;

a fuel injection line communicating at one end thereof to said recirculation circuit at a point between said high-pressure pump and said high-pressure control means and at an opposite end thereof to said fuel tank via a fuel injector;

a switching valve arranged in said fuel injection line on a downstream side of said fuel injector to open or close said fuel injection line;

low-pressure control means for controlling the pressure of fuel in said fuel injection line on an upstream side of said switching valve at a pressure lower than a control pressure set by said high-pressure control means while said switching valve is open; and control means for performing open/close control of said switching valve so that said switching valve is closed in an ordinary operation state of said internal combustion engine but is opened in a specific operation state of said internal combustion engine, said specific operation state including at least an operation state at a start-up of said internal combustion engine.

\* \* \* \* \*